United States Patent
Chiang et al.

(10) Patent No.: US 9,830,494 B2
(45) Date of Patent: Nov. 28, 2017

(54) CAPACITIVE FINGERPRINT SENSING APPARATUS AND CAPACITIVE FINGERPRINT SENSING METHOD

(71) Applicant: Raydium Semiconductor Corporation, Hsinchu (TW)

(72) Inventors: Chang-Ching Chiang, Taichung (TW); Kun-Pei Lee, Miaoli County (TW)

(73) Assignee: Raydium Semiconductor Corporation, Hsinchu County (TW)

( * ) Notice: Subject to any disclaimer, the term of this patent is extended or adjusted under 35 U.S.C. 154(b) by 0 days.

(21) Appl. No.: 15/206,587

(22) Filed: Jul. 11, 2016

(65) Prior Publication Data
US 2017/0024598 A1    Jan. 26, 2017

Related U.S. Application Data

(60) Provisional application No. 62/195,881, filed on Jul. 23, 2015, provisional application No. 62/204,484, filed on Aug. 13, 2015.

(51) Int. Cl.
*G06K 9/00* (2006.01)
*G06K 9/38* (2006.01)

(52) U.S. Cl.
CPC ............ *G06K 9/0002* (2013.01); *G06K 9/38* (2013.01)

(58) Field of Classification Search
CPC .... G06K 9/0002; G06K 9/38; G01R 27/2605; G01D 5/24; G01D 5/2417; G01N 27/228; G01N 27/22
See application file for complete search history.

(56) References Cited

U.S. PATENT DOCUMENTS

| | | | | |
|---|---|---|---|---|
| 6,011,859 A * | 1/2000 | Kalnitsky | .......... | G06K 9/00053 382/100 |
| 6,392,636 B1 * | 5/2002 | Ferrari | ............... | G06F 3/03547 345/157 |
| 6,525,547 B2 * | 2/2003 | Hayes | ................ | G06K 9/0002 324/662 |
| 2001/0012384 A1 * | 8/2001 | Kalnitsky | ............... | G06F 3/044 382/124 |
| 2012/0105081 A1 * | 5/2012 | Shaikh | ................ | G06K 9/0002 324/686 |
| 2013/0135247 A1 * | 5/2013 | Na | .......................... | G06F 21/32 345/174 |

(Continued)

*Primary Examiner* — Samir Ahmed

(57) ABSTRACT

A capacitive fingerprint sensing apparatus including sensing electrodes, a scanning driver, a sensing driver and a processing module is disclosed. In a self-capacitive sensing mode, the scanning driver drives a pair of adjacent scanning lines among the scanning lines and the sensing driver performs self-capacitive sensing through at least one sensing line among the sensing lines to obtain a first fingerprint sensing signal. In a mutual-capacitive sensing mode, the scanning driver drives the pair of adjacent scanning lines and the sensing driver performs mutual-capacitive sensing through at least two adjacent sensing lines among the sensing lines to obtain a second fingerprint sensing signal. The processing module generates a first fingerprint pattern and a second fingerprint pattern according to the first fingerprint sensing signal and the second fingerprint sensing signal and combines the first fingerprint pattern and the second fingerprint pattern into a combined fingerprint pattern.

34 Claims, 16 Drawing Sheets

(56) References Cited

U.S. PATENT DOCUMENTS

| | | | | |
|---|---|---|---|---|
| 2013/0160109 A1* | 6/2013 | Klinghult | ............. | G01J 5/0025 |
| | | | | 726/19 |
| 2014/0292396 A1* | 10/2014 | Bruwer | ............... | H03K 17/955 |
| | | | | 327/517 |
| 2015/0195007 A1* | 7/2015 | He | ...................... | H04B 5/0012 |
| | | | | 455/41.1 |
| 2015/0242673 A1* | 8/2015 | Singhal | ............. | G06K 9/00013 |
| | | | | 345/174 |

* cited by examiner

CAPACITIVE FINGERPRINT SENSING APPARATUS AND CAPACITIVE FINGERPRINT SENSING METHOD

BACKGROUND OF THE INVENTION

1. Field of the Invention

This invention relates to fingerprint sensing, especially to a capacitive fingerprint sensing apparatus and a capacitive fingerprint sensing method.

2. Description of the Prior Art

With the developing of technology, the capacitive fingerprint sensing technology can be widely used in various kinds of electronic devices, especially portable electronic devices such as smart phones, notebook PCs and tablet PCs. However, the fingerprint sensing technology has high resolution requirement; under the IAFIS standard, the fingerprint sensing chip should have at least resolution of 500 dpi and its unit sensing area should be 50 um*50 um. Under this condition, the capacity sensed by the unit sensing area will be small and easily interfered by the noises, so that fingerprint recognition will become harder.

Therefore, the invention provides a capacitive fingerprint sensing apparatus and a capacitive fingerprint sensing method to solve the above-mentioned problems.

SUMMARY OF THE INVENTION

A first preferred embodiment of the invention is a capacitive fingerprint sensing apparatus. In this embodiment, the capacitive fingerprint sensing apparatus is operated in a self-capacitive sensing mode or a mutual-capacitive sensing mode. The capacitive fingerprint sensing apparatus includes (M*N) sensing electrodes, a scanning driver, a sensing driver and a processing module. The (M*N) sensing electrodes are arranged to form a (M*N) matrix having M rows of sensing electrodes and N columns of sensing electrodes, wherein M and N are both positive integers. The scanning driver is coupled to the M rows of sensing electrodes respectively through M scanning lines. The sensing driver is coupled to the N columns of sensing electrodes respectively through N sensing lines. The processing module is coupled to the scanning driver and the sensing driver. When the capacitive fingerprint sensing apparatus is operated in the self-capacitive sensing mode, the scanning driver drives a pair of adjacent scanning lines among the M scanning lines and the sensing driver performs a self-capacitive sensing through at least one sensing line among the N sensing lines to obtain a first fingerprint sensing signal; when the capacitive fingerprint sensing apparatus is operated in the mutual-capacitive sensing mode, the scanning driver drives the pair of adjacent scanning lines and the sensing driver performs a mutual-capacitive sensing through at least two adjacent sensing lines among the N sensing lines to obtain a second fingerprint sensing signal; the processing module generates a first fingerprint pattern and a second fingerprint pattern according to the first fingerprint sensing signal and the second fingerprint sensing signal and combines the first fingerprint pattern and the second fingerprint pattern into a combined fingerprint pattern.

In an embodiment, when the capacitive fingerprint sensing apparatus is operated in the mutual-capacitive sensing mode, the sensing driver selects at least two adjacent sensing electrodes coupled to the at least two adjacent sensing lines as a mutual-capacitive sensing electrode set and selects a part of the mutual-capacitive sensing electrode set as a signal transmitter (TX) and another part of the mutual-capacitive sensing electrode set as a signal receiver (RX) to perform the mutual-capacitive sensing between the signal transmitter (TX) and the signal receiver (RX).

In an embodiment, when the capacitive fingerprint sensing apparatus is operated in the mutual-capacitive sensing mode, other sensing lines other than the at least two adjacent sensing lines among the N sensing lines receive DC voltage, ground voltage or maintain in floating state.

In an embodiment, when the capacitive fingerprint sensing apparatus is operated in the self-capacitive sensing mode, other sensing lines other than the at least one adjacent sensing line among the N sensing lines receive DC voltage, ground voltage or maintain in floating state.

In an embodiment, a ratio of a first direction distance between two adjacent sensing electrodes in the same row of sensing electrodes and a second direction distance between two adjacent sensing electrodes in the same column of sensing electrodes is d1:d2, a ratio of a first direction resolution and a second direction resolution of the first fingerprint pattern and the second fingerprint pattern is d2:d1, and a ratio of a first direction resolution and a second direction resolution of the combined fingerprint pattern is (2*d2):d1.

In an embodiment, d1:d2 is any ratio.

In an embodiment, when d1 is equal to (2*d2), the first direction resolution and the second direction resolution of the combined fingerprint pattern are the same; when d1 is larger than (2*d2), the first direction resolution of the combined fingerprint pattern is smaller than the second direction resolution of the combined fingerprint pattern; when d1 is smaller than (2*d2), the first direction resolution of the combined fingerprint pattern is larger than the second direction resolution of the combined fingerprint pattern.

In an embodiment, the (M*N) sensing electrodes have arbitrary geometry.

In an embodiment, the (M*N) sensing electrodes have the same or different size, shape and/or distance.

In an embodiment, when the capacitive fingerprint sensing apparatus is operated in the self-capacitive sensing mode, the sensing driver combines at least two sensing electrodes of the (M*N) sensing electrodes into a self-capacitive sensing electrode set to perform self-capacitive sensing to increase sensed self-capacity.

In an embodiment, sensing points of the first fingerprint pattern and the second fingerprint pattern are interlaced, so that a resolution of the combined fingerprint pattern is higher than a resolution of the first fingerprint pattern or the second fingerprint pattern.

In an embodiment, the capacitive fingerprint sensing apparatus includes a switching module coupled between the sensing driver and the processing module, wherein the switching module selectively switches between the self-capacitive sensing mode and the mutual-capacitive sensing mode and transmits the first fingerprint sensing signal and the second fingerprint sensing signal to the processing module.

In an embodiment, the capacitive fingerprint sensing apparatus includes an amplifying module coupled between the switching module and the processing module, wherein the amplifying module amplifies the first fingerprint sensing signal and the second fingerprint sensing signal and then transmits the amplified first fingerprint sensing signal and second fingerprint sensing signal to the processing module.

A second preferred embodiment of the invention is a capacitive fingerprint sensing method. In this embodiment, the capacitive fingerprint sensing method is applied in a self-capacitive sensing mode or a mutual-capacitive sensing mode. The capacitive fingerprint sensing method includes steps of: arranging (M*N) sensing electrodes to form a (M*N) matrix having M rows of sensing electrodes and N columns of sensing electrodes, wherein M and N are both positive integers; coupling a scanning driver to the M rows of sensing electrodes respectively through M scanning lines and coupling a sensing driver to the N columns of sensing electrodes respectively through N sensing lines; in the self-capacitive sensing mode, the scanning driver driving a pair of adjacent scanning lines among the M scanning lines and the sensing driver performing a self-capacitive sensing through at least one sensing line among the N sensing lines to obtain a first fingerprint sensing signal; in the mutual-capacitive sensing mode, the scanning driver driving the pair of adjacent scanning lines and the sensing driver performing a mutual-capacitive sensing through at least two adjacent sensing lines among the N sensing lines to obtain a second fingerprint sensing signal; and generating a first fingerprint pattern and a second fingerprint pattern according to the first fingerprint sensing signal and the second fingerprint sensing signal and combining the first fingerprint pattern and the second fingerprint pattern into a combined fingerprint pattern.

A third preferred embodiment of the invention is a capacitive fingerprint sensing apparatus. In this embodiment, the capacitive fingerprint sensing apparatus is operated in a self-capacitive sensing mode or a mutual-capacitive sensing mode. The capacitive fingerprint sensing apparatus includes (M*N) sensing electrodes, a scanning driver, a sensing driver and a processing module. (M*N) sensing electrodes are arranged to form a (M*N) matrix having M rows of sensing electrodes and N columns of sensing electrodes, wherein M and N are both positive integers. The scanning driver is coupled to the M rows of sensing electrodes respectively through M scanning lines. The sensing driver is coupled to the N columns of sensing electrodes respectively through N pairs of sensing lines, wherein a pair of sensing lines among the N pairs of sensing lines is coupled to a column of sensing electrodes among the N columns of sensing electrodes, the pair of sensing lines includes a first sensing line and a second sensing line, the first sensing line is coupled to an odd sensing electrode among the column of sensing electrodes and the second sensing line is coupled to an even sensing electrode among the column of sensing electrodes, or the second sensing line is coupled to the odd sensing electrode among the column of sensing electrodes and the first sensing line is coupled to the even sensing electrode among the column of sensing electrodes; the first sensing line is coupled to an odd scanning line among the M scanning lines and the second sensing line is coupled to an even scanning line among the M scanning lines, or the second sensing line is coupled to the odd scanning line among the M scanning lines and the first sensing line is coupled to the even scanning line among the M scanning lines. The processing module is coupled to the scanning driver and the sensing driver. When the capacitive fingerprint sensing apparatus is operated in the self-capacitive sensing mode, the scanning driver drives the odd scanning line and the even scanning line among the M scanning lines and the sensing driver performs a self-capacitive sensing through at least one sensing line among the N pairs of sensing lines to obtain a first fingerprint sensing signal; when the capacitive fingerprint sensing apparatus is operated in the mutual-capacitive sensing mode, the scanning driver drives a pair of adjacent scanning lines among the M scanning lines and the sensing driver performs a mutual-capacitive sensing through the first sensing line and the second sensing line to obtain a second fingerprint sensing signal; the processing module generates a first fingerprint pattern and a second fingerprint pattern according to the first fingerprint sensing signal and the second fingerprint sensing signal and combines the first fingerprint pattern and the second fingerprint pattern into a combined fingerprint pattern.

A fourth preferred embodiment of the invention is a capacitive fingerprint sensing method. In this embodiment, the capacitive fingerprint sensing method is applied in a self-capacitive sensing mode or a mutual-capacitive sensing mode. The capacitive fingerprint sensing method includes steps of: arranging (M*N) sensing electrodes to form a (M*N) matrix having M rows of sensing electrodes and N columns of sensing electrodes, wherein M and N are both positive integers; coupling a scanning driver to the M rows of sensing electrodes respectively through M scanning lines and coupling a sensing driver to the N columns of sensing electrodes respectively through N pairs of sensing lines, wherein a pair of sensing lines among the N pairs of sensing lines is coupled to a column of sensing electrodes among the N columns of sensing electrodes, the pair of sensing lines includes a first sensing line and a second sensing line, the first sensing line is coupled to an odd sensing electrode among the column of sensing electrodes and the second sensing line is coupled to an even sensing electrode among the column of sensing electrodes, or the second sensing line is coupled to the odd sensing electrode among the column of sensing electrodes and the first sensing line is coupled to the even sensing electrode among the column of sensing electrodes; the first sensing line is coupled to an odd scanning line among the M scanning lines and the second sensing line is coupled to an even scanning line among the M scanning lines, or the second sensing line is coupled to the odd scanning line among the M scanning lines and the first sensing line is coupled to the even scanning line among the M scanning lines; in the self-capacitive sensing mode, the scanning driver driving the odd scanning line and the even scanning line among the M scanning lines and the sensing driver performing a self-capacitive sensing through at least one sensing line among the N pairs of sensing lines to obtain a first fingerprint sensing signal; in the mutual-capacitive sensing mode, the scanning driver driving a pair of adjacent scanning lines among the M scanning lines and the sensing driver performing a mutual-capacitive sensing through the first sensing line and the second sensing line to obtain a second fingerprint sensing signal; and generating a first fingerprint pattern and a second fingerprint pattern according to the first fingerprint sensing signal and the second fingerprint sensing signal and combining the first fingerprint pattern and the second fingerprint pattern into a combined fingerprint pattern.

A fifth preferred embodiment of the invention is a capacitive fingerprint sensing apparatus. In this embodiment, the capacitive fingerprint sensing apparatus is operated in a self-capacitive sensing mode, a first mutual-capacitive sensing mode or a second mutual-capacitive sensing mode. The capacitive fingerprint sensing apparatus includes (M*N) sensing electrodes, a scanning driver, a sensing driver and a processing module. The (M*N) sensing electrodes are arranged along a first direction and a second direction respectively to form M rows of sensing electrodes and N columns of sensing electrodes, wherein odd sensing electrodes and even sensing electrodes among each row of sensing electrodes are interlaced, M and N are both positive integers. The scanning driver is coupled to the M rows of sensing electrodes respectively through M scanning lines.

The sensing driver is coupled to the N columns of sensing electrodes respectively through N pairs of sensing lines, wherein a pair of sensing lines among the N pairs of sensing lines includes a first sensing line and a second sensing line, the first sensing line is coupled to an odd sensing electrode among a column of sensing electrodes among the N column of sensing electrodes and the second sensing line is coupled to an even sensing electrode among the column of sensing electrodes, or the second sensing line is coupled to the odd sensing electrode among the column of sensing electrodes and the first sensing line is coupled to the even sensing electrode among the column of sensing electrodes; the first sensing line is coupled to an odd scanning line among the M scanning lines and the second sensing line is coupled to an even scanning line among the M scanning lines, or the second sensing line is coupled to the odd scanning line among the M scanning lines and the first sensing line is coupled to the even scanning line among the M scanning lines. The processing module is coupled to the scanning driver and the sensing driver, when the capacitive fingerprint sensing apparatus is operated in the self-capacitive sensing mode, the scanning driver drives the M scanning lines and the sensing driver performs a self-capacitive sensing through at least one sensing line among the N pairs of sensing lines to obtain a first fingerprint sensing signal; when the capacitive fingerprint sensing apparatus is operated in the first mutual-capacitive sensing mode, the scanning driver drives a scanning line among the M scanning lines and the sensing driver selects sensing electrodes coupled to an even sensing line and an odd sensing line among the sensing lines respectively coupled by the driven scanning line to perform a mutual-capacitive sensing to obtain a second fingerprint sensing signal; when the capacitive fingerprint sensing apparatus is operated in the second mutual-capacitive sensing mode, the scanning driver drives a pair of adjacent scanning lines among the M scanning lines and the sensing driver selects at least one sensing electrode among a row of sensing electrodes coupled by the pair of adjacent scanning lines and corresponding at least one sensing electrode among the other row of sensing electrodes coupled by the pair of adjacent scanning lines to perform another mutual-capacitive sensing to obtain a third fingerprint sensing signal; the processing module generates a first fingerprint pattern, a second fingerprint pattern and a third fingerprint pattern according to the first fingerprint sensing signal, the second fingerprint sensing signal and the third fingerprint sensing signal respectively and combines the first fingerprint pattern, the second fingerprint pattern and the third fingerprint pattern into a combined fingerprint pattern.

A sixth preferred embodiment of the invention is a capacitive fingerprint sensing method. In this embodiment, the capacitive fingerprint sensing method is applied in a self-capacitive sensing mode, a first mutual-capacitive sensing mode or a second mutual-capacitive sensing mode. The capacitive fingerprint sensing method includes steps of: arranging (M*N) sensing electrodes along a first direction and a second direction respectively to form M rows of sensing electrodes and N columns of sensing electrodes, wherein odd sensing electrodes and even sensing electrodes among each row of sensing electrodes are interlaced, M and N are both positive integers; coupling a scanning driver to the M rows of sensing electrodes respectively through M scanning lines and a sensing driver coupled to the N columns of sensing electrodes respectively through N pairs of sensing lines, wherein a pair of sensing lines among the N pairs of sensing lines includes a first sensing line and a second sensing line, the first sensing line is coupled to an odd sensing electrode among a column of sensing electrodes among the N column of sensing electrodes and the second sensing line is coupled to an even sensing electrode among the column of sensing electrodes, or the second sensing line is coupled to the odd sensing electrode among the column of sensing electrodes and the first sensing line is coupled to the even sensing electrode among the column of sensing electrodes; the first sensing line is coupled to an odd scanning line among the M scanning lines and the second sensing line is coupled to an even scanning line among the M scanning lines, or the second sensing line is coupled to the odd scanning line among the M scanning lines and the first sensing line is coupled to the even scanning line among the M scanning lines; in the self-capacitive sensing mode, the scanning driver driving the M scanning lines and the sensing driver performing a self-capacitive sensing through at least one sensing line among the N pairs of sensing lines to obtain a first fingerprint sensing signal; in the first mutual-capacitive sensing mode, the scanning driver driving a scanning line among the M scanning lines and the sensing driver selecting sensing electrodes coupled to an even sensing line and an odd sensing line among the sensing lines respectively coupled by the driven scanning line to perform a mutual-capacitive sensing to obtain a second fingerprint sensing signal; in the second mutual-capacitive sensing mode, the scanning driver driving a pair of adjacent scanning lines among the M scanning lines and the sensing driver selecting at least one sensing electrode among a row of sensing electrodes coupled by the pair of adjacent scanning lines and corresponding at least one sensing electrode among the other row of sensing electrodes coupled by the pair of adjacent scanning lines to perform another mutual-capacitive sensing to obtain a third fingerprint sensing signal; generating a first fingerprint pattern, a second fingerprint pattern and a third fingerprint pattern according to the first fingerprint sensing signal, the second fingerprint sensing signal and the third fingerprint sensing signal respectively and combining the first fingerprint pattern, the second fingerprint pattern and the third fingerprint pattern into a combined fingerprint pattern.

Compared to the prior art, the capacitive fingerprint sensing apparatus and capacitive fingerprint sensing method of the invention perform fingerprint sensing through self-capacitive sensing technology and mutual-capacitive sensing technology respectively and combine the self-capacitive fingerprint pattern and the mutual-capacitive fingerprint pattern into a combined fingerprint pattern. Therefore, the capacitive fingerprint sensing apparatus and capacitive fingerprint sensing method of the invention can effectively increase the capacity sensed by the unit sensing electrode without decreasing its high resolution. As a result, not only the noise interference can be reduced to increase the accuracy of fingerprint recognition, but also the number of signal traces can be also reduced to simplify the circuit structure and save the chip area.

The advantage and spirit of the invention may be understood by the following detailed descriptions together with the appended drawings.

BRIEF DESCRIPTION OF THE APPENDED DRAWINGS

FIG. 1 illustrates a schematic diagram of the capacitive fingerprint sensing apparatus in a first preferred embodiment of the invention.

FIG. 2A~FIG. 2C illustrate an embodiment of the first fingerprint pattern, the second fingerprint pattern and the combined fingerprint pattern respectively.

Figure 8A:
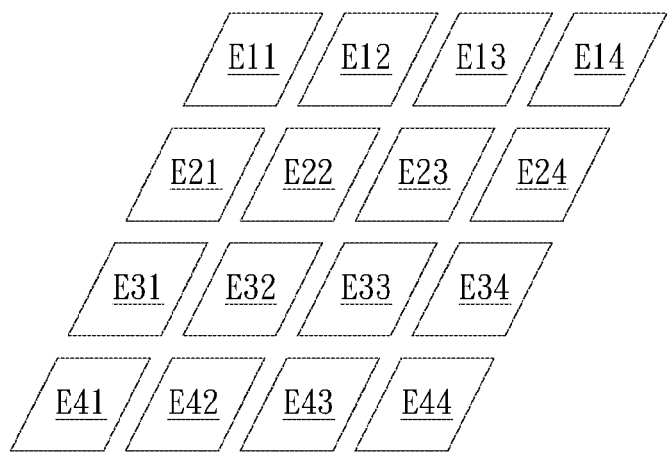
Figure 8B:
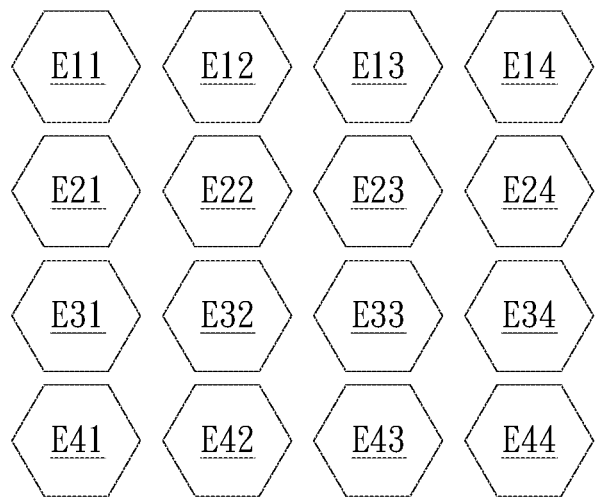
Figure 8C:
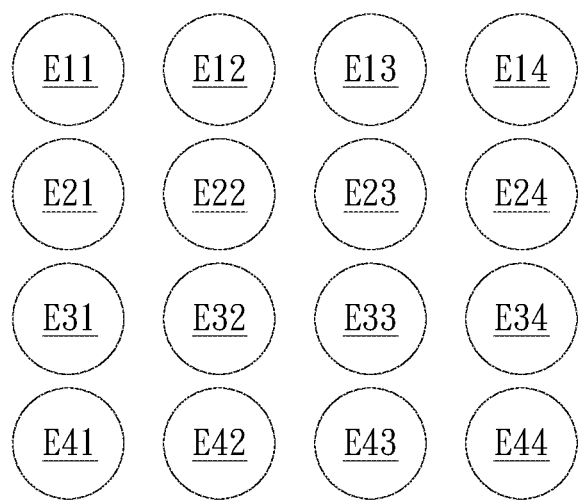

FIG. 8A~FIG. 8C illustrate different sensing electrode arrangements respectively.

Figure 9A:
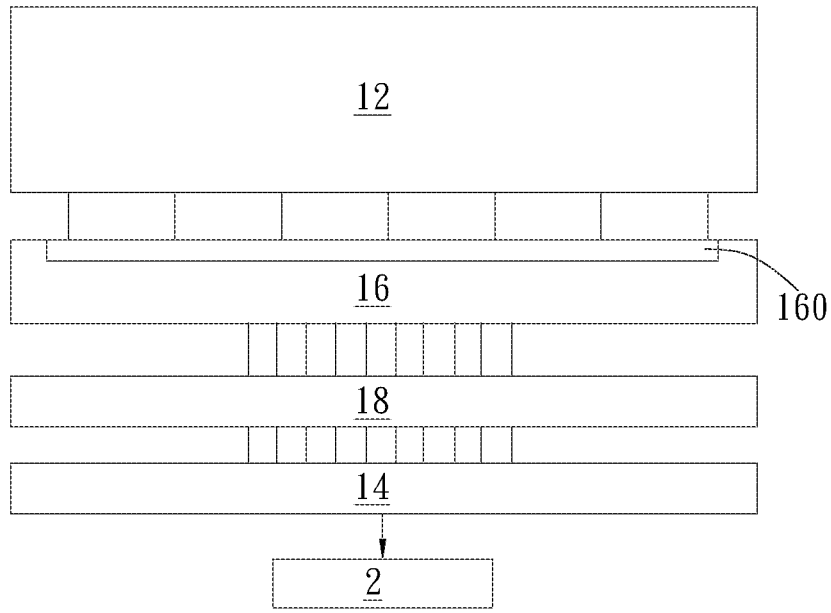

FIG. 9A illustrates a schematic diagram of the sensing driver coupled to the processing module though the switching module and the amplifying module.

Figure 9B:
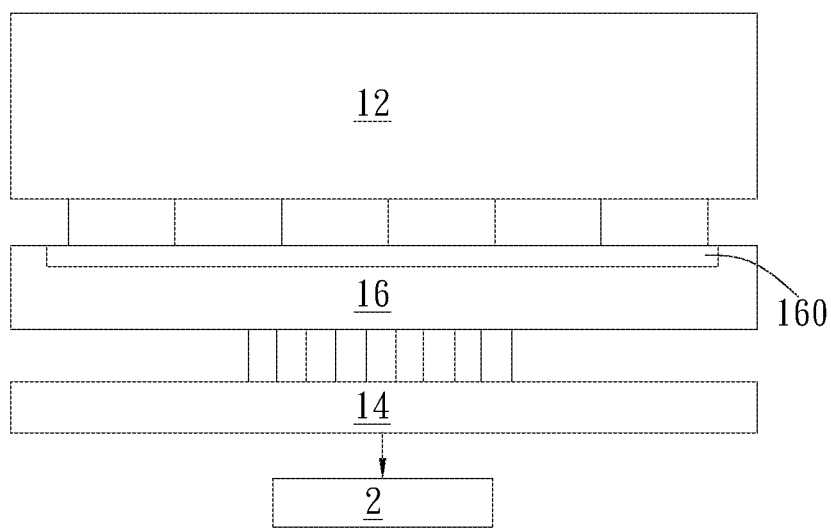

FIG. 9B illustrates a schematic diagram of the sensing driver coupled to the processing module though the switching module.

Figure 10:
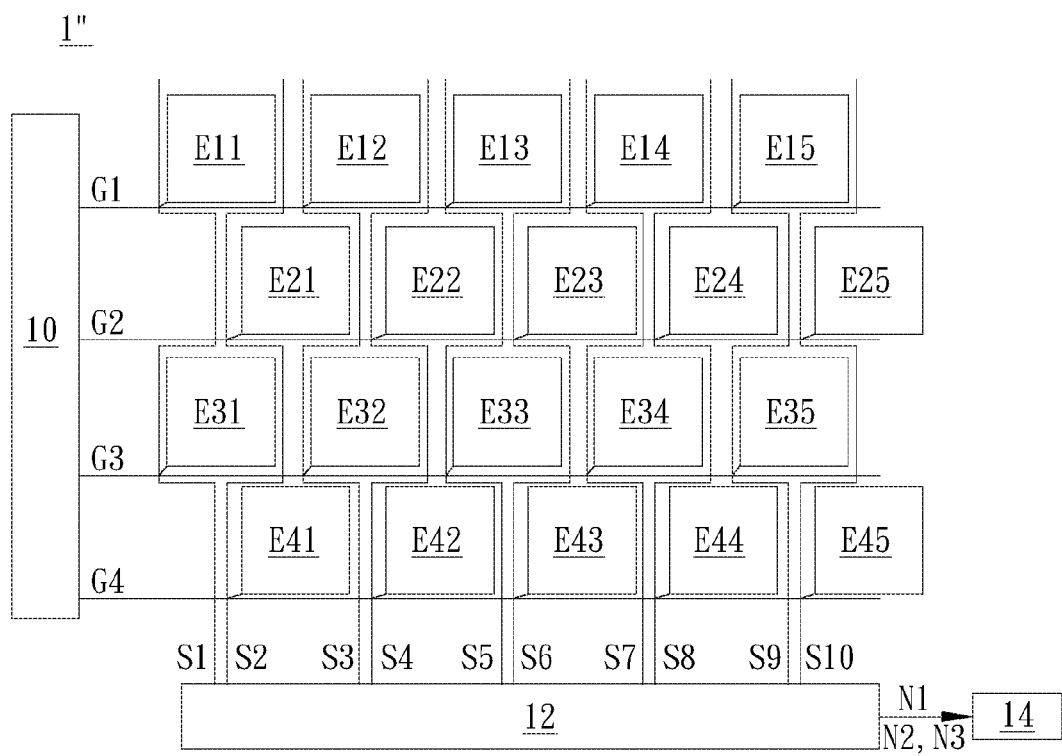

FIG. 10 illustrates a schematic diagram of the capacitive fingerprint sensing apparatus in a fifth preferred embodiment of the invention.

Figure 11A:
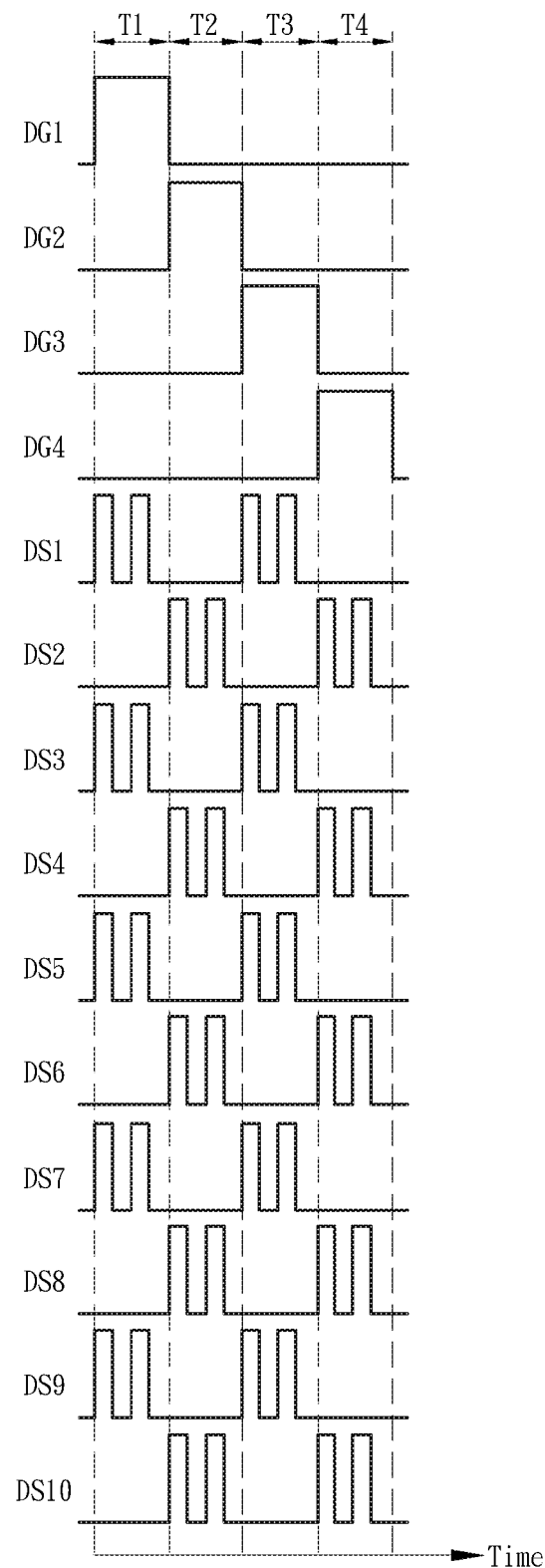

FIG. 11A illustrates a timing diagram of the scan driving signals and the sense driving signals when the capacitive fingerprint sensing apparatus is operated in the self-capacitive sensing mode.

Figure 11B:
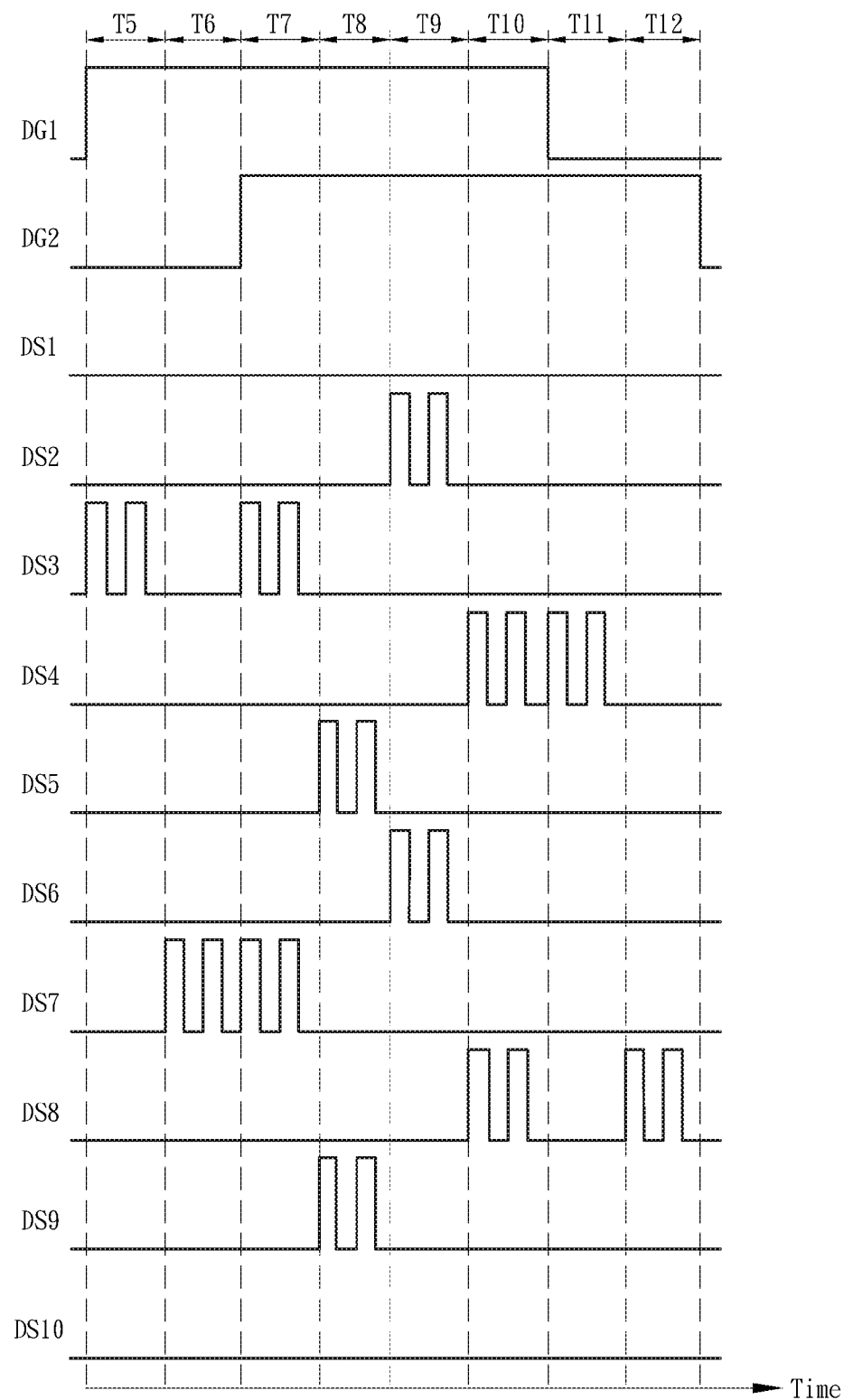

FIG. 11B illustrates a timing diagram of the scan driving signals and the sense driving signals when the capacitive fingerprint sensing apparatus is operated in the mutual-capacitive sensing mode.

Figure 12:
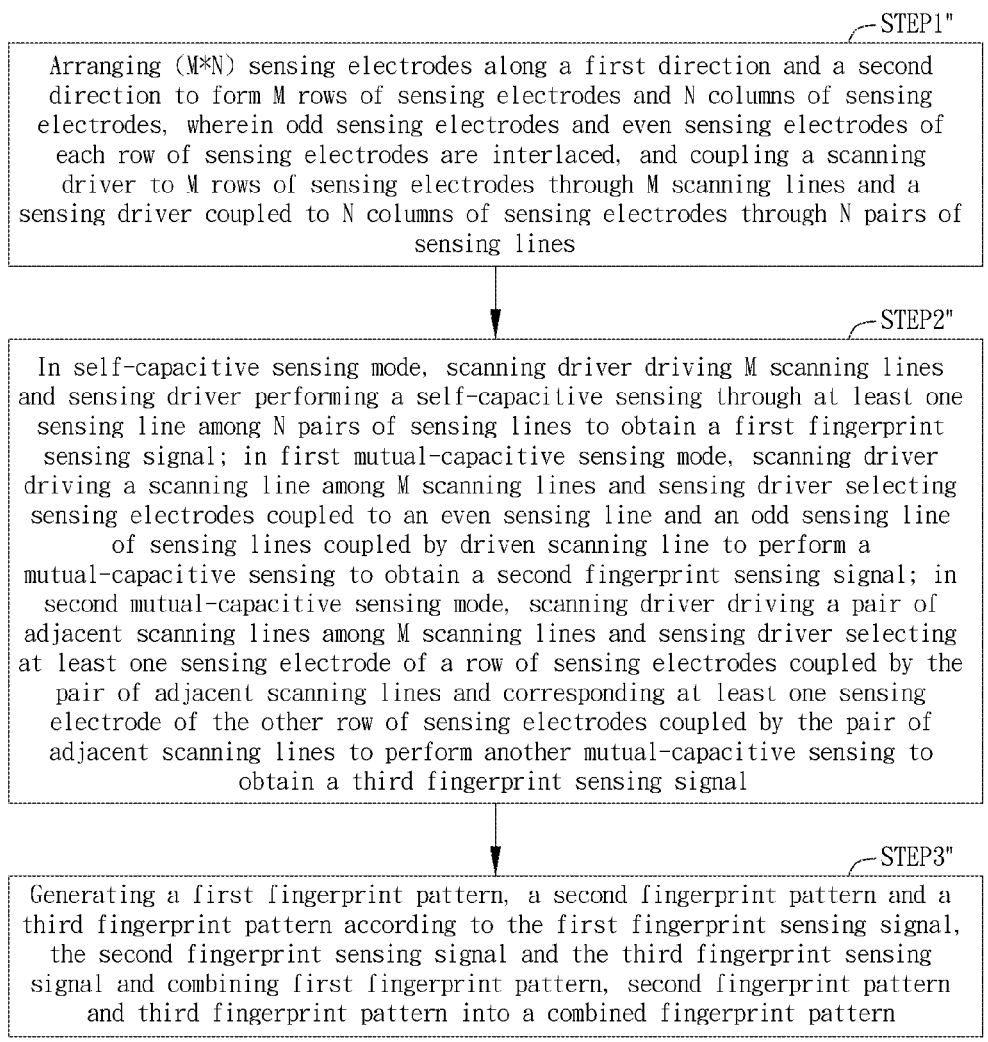

FIG. 12 illustrates a flowchart of the capacitive fingerprint sensing method in a sixth preferred embodiment of the invention.

FIG. 13A~FIG. 13D illustrate different sensing electrode arrangements respectively.

DETAILED DESCRIPTION OF THE INVENTION

A preferred embodiment of the invention is a capacitive fingerprint sensing apparatus. In this embodiment, the capacitive fingerprint sensing apparatus of the invention uses the self-capacitive sensing technology to perform a fingerprint sensing and uses the mutual-capacitive sensing technology to perform another fingerprint sensing respectively, and then the capacitive fingerprint sensing apparatus combines the self-capacitive fingerprint pattern and the mutual-capacitive fingerprint pattern into a combined fingerprint pattern. Since the self-capacitive sensing points in the first fingerprint pattern and the mutual-capacitive sensing points in the second fingerprint pattern are interlaced, the resolution of the combined fingerprint pattern along at least one direction will be larger than the resolution of the first fingerprint pattern and the second fingerprint pattern along the at least one direction.

Figure 1:
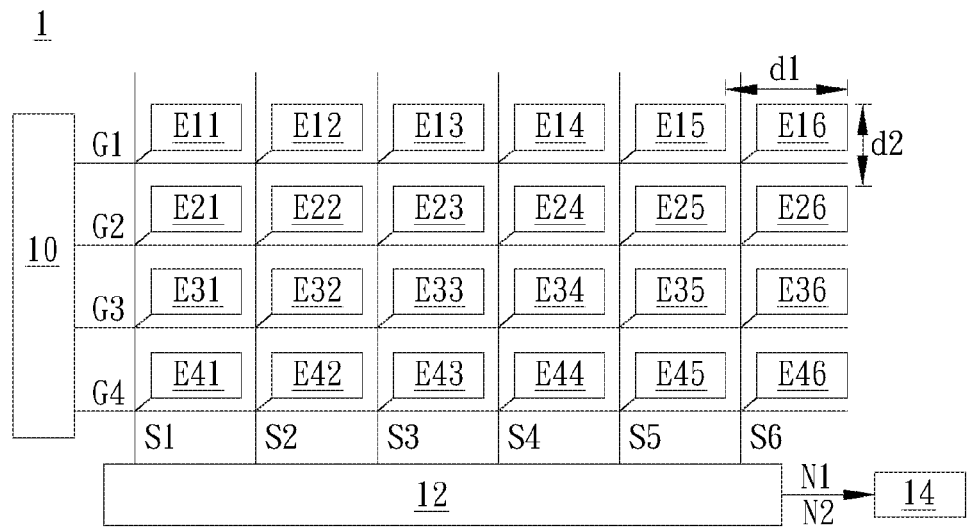

At first, please refer to FIG. 1. FIG. 1 illustrates a schematic diagram of the capacitive fingerprint sensing apparatus in a first preferred embodiment of the invention. As shown in FIG. 1, the capacitive fingerprint sensing apparatus 1 includes sensing electrodes E11~E46, a scanning driver 10, a sensing driver 12 and a processing module 14. Wherein, the sensing electrodes E11~E46 are arranged in a form of (4*6) matrix. That is to say, it is assumed that the capacitive fingerprint sensing apparatus 1 includes (M*N) sensing electrodes, and M=4 and N=6 in this embodiment, but not limited to this.

In the horizontal direction, the (4*6) matrix includes a first row of sensing electrodes E11~E16, a second row of sensing electrodes E21~E26, a third row of sensing electrodes E31~E36 and a fourth row of sensing electrodes E41~E46; in the vertical direction, the (4*6) matrix includes a first column of sensing electrodes E11~E41, a second column of sensing electrodes E12~E42, a third column of sensing electrodes E13~E43, a fourth column of sensing electrodes E14~E44, a fifth column of sensing electrodes E15~E45 and a sixth column of sensing electrodes E16~E46.

The scanning driver 10 is coupled to the first row of sensing electrodes E11~E16, the second row of sensing electrodes E21~E26, the third row of sensing electrodes E31~E36 and the fourth row of sensing electrodes E41~E46 through scanning lines G1~G4 respectively; the sensing driver 12 is coupled to the first column of sensing electrodes E11~E41, the second column of sensing electrodes E12~E42, the third column of sensing electrodes E13~E43, the fourth column of sensing electrodes E14~E44, the fifth column of sensing electrodes E15~E45 and the sixth column of sensing electrodes E16~E46 through sensing lines S1~S6 respectively.

For each row of sensing electrodes, there is a first distance d1 between two adjacent sensing electrodes (e.g., the sensing electrodes E15 and E16); for each column of sensing electrodes, there is a second distance d2 between two adjacent sensing electrodes (e.g., the sensing electrodes E16 and E26). In other words, a ratio of the first distance d1 between the two adjacent sensing electrodes among the same row of sensing electrodes along the horizontal direction and the second distance d2 between the two adjacent sensing electrodes among the same column of sensing electrodes along the vertical direction is d1:d2. In fact, the first distance d1 and the second distance d2 can be the same or different; that is to say, the ratio d1:d2 of the first distance d1 and the second distance d2 can be any ratio without any specific limitations.

In this embodiment, the scanning driver 10 will perform a scanning on the first row of sensing electrodes E11~E16, the second row of sensing electrodes E21~E26, the third row of sensing electrodes E31~E36 and the fourth row of sensing electrodes E41~E46 through the scanning lines G1~G4 respectively; the sensing driver 12 will perform a sensing on the first column of sensing electrodes E11~E41, the second column of sensing electrodes E12~E42, the third column of sensing electrodes E13~E43, the fourth column of sensing electrodes E14~E44, the fifth column of sensing electrodes E15~E45 and the sixth column of sensing electrodes E16~E46 through sensing lines S1~S6 respectively.

It should be noticed that when the capacitive fingerprint sensing apparatus 1 is operated in the self-capacitive sensing mode, the scanning driver 10 will drive a pair of adjacent scanning lines (e.g., the adjacent scanning lines G1 and G2) among the scanning lines G1~G4 and the sensing driver 12 will perform self-capacitive sensing on at least one sensing electrode (e.g., the sensing electrode E11) through at least one sensing line (e.g., the sensing line S1) among the sensing lines S1~S6 to obtain a first fingerprint sensing signal (namely the self-capacitive fingerprint sensing signal) N1.

For example, when the capacitive fingerprint sensing apparatus 1 is operated in the self-capacitive sensing mode, the sensing driver 12 can combine at least two sensing electrodes (e.g., the sensing electrodes E11 and E12) among the sensing electrodes into a self-capacitive sensing electrode set to perform self-capacitive sensing together to increase the self-capacitive sensed capacity, but not limited to this. In fact, when the capacitive fingerprint sensing apparatus 1 is operated in the self-capacitive sensing mode, other sensing lines (e.g., the sensing lines S2~S6) other than the at least one sensing line (e.g., the sensing line S1) among all the sensing lines S1~S6 can receive DC voltage, ground voltage, sensing related signal or maintain in the floating state to reduce the fingerprint sensing interference, but not limited to this. When the capacitive fingerprint sensing apparatus 1 is operated in the mutual-capacitive sensing mode, the scanning driver 10 drives the pair of adjacent scanning lines (e.g., the adjacent scanning lines G1 and G2) and the sensing driver 12 can perform mutual-capacitive sensing on the at least two adjacent sensing electrodes (e.g., the sensing electrodes E11 and E12) through at least two adjacent sensing lines (e.g., the sensing lines S1 and S2) among the sensing lines S1~S6 to obtain a second fingerprint sensing signal (namely the mutual-capacitive fingerprint sensing signal) N2.

In practical applications, when the capacitive fingerprint sensing apparatus 1 is operated in the mutual-capacitive sensing mode, the sensing driver 12 can combine at least two adjacent sensing electrodes (e.g., the sensing electrodes E11 and E12) coupled to the at least two adjacent sensing lines (e.g., the sensing lines S1 and S2) as a mutual-capacitive sensing electrode set and select a part of the mutual-capacitive sensing electrode set as the signal transmitter (TX) and another part of the mutual-capacitive sensing electrode set as the signal receiver (RX) to sense the mutual-capacity between the signal transmitter (TX) and the signal receiver (RX) to obtain the second fingerprint sensing signal (namely the mutual-capacitive fingerprint sensing signal) N2. In addition, when the capacitive fingerprint sensing apparatus 1 is operated in the mutual-capacitive sensing mode, other sensing lines (e.g., the sensing lines S3~S6) other than the at least two sensing lines (e.g., the sensing lines S1~S2) among all the sensing lines S1~S6 can receive DC voltage, ground voltage, sensing related signal or maintain in the floating state to reduce the fingerprint sensing interference.

Then, when the processing module 14 receives the first fingerprint sensing signal N1 and the second fingerprint sensing signal N2 from the sensing driver 12 respectively, the processing module 14 will obtain a first fingerprint pattern P1 and a second fingerprint pattern P2 according to the first fingerprint sensing signal N1 and the second fingerprint sensing signal N2 respectively and combine the first fingerprint pattern P1 and the second fingerprint pattern P2 into a combined fingerprint pattern P3. In practical applications, the first fingerprint pattern P1 and the second fingerprint pattern P2 can have the same resolution or different resolutions along different directions, and the combined fingerprint pattern P3 can have the same resolution or different resolutions along different directions without any specific limitations.

Figure 2A:
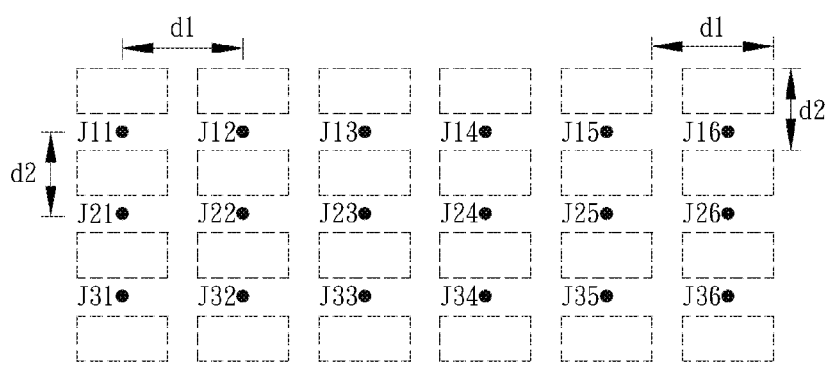
Figure 2B:
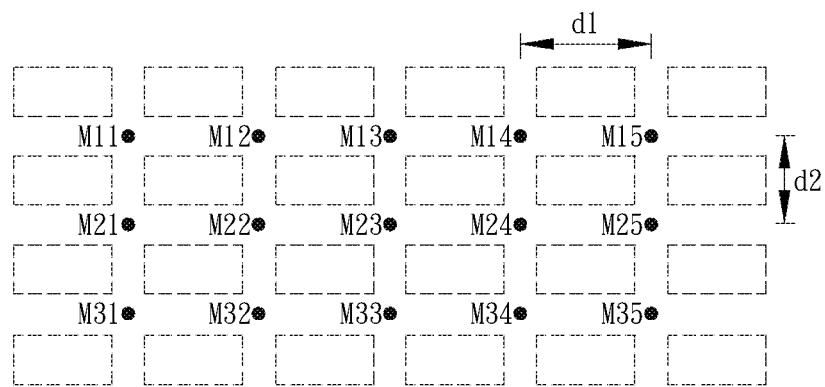
Figure 2C:
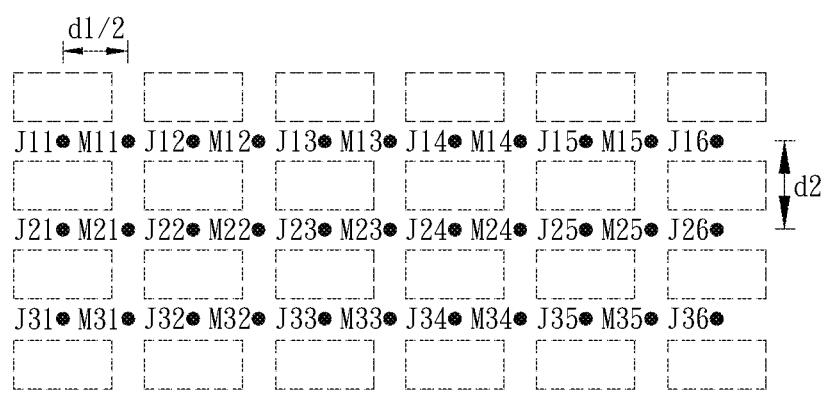

Please refer to FIG. 2A~FIG. 2C. FIG. 2A~FIG. 2C illustrate an embodiment of the first fingerprint pattern, the second fingerprint pattern and the combined fingerprint pattern respectively. As shown in FIG. 2A, it is assumed that a ratio of the first distance d1 between the two adjacent sensing electrodes among the same row of sensing electrodes along the horizontal direction and the second distance d2 between the two adjacent sensing electrodes among the same column of sensing electrodes along the vertical direction is d1:d2, then the distance between the two adjacent sensing electrodes along the horizontal direction in the first fingerprint pattern P1 is d1 and the distance between the two adjacent sensing electrodes along the vertical direction in the first fingerprint pattern P1 is d2, so that the ratio of the horizontal direction resolution and the vertical direction resolution of the first fingerprint pattern P1 is d2:d1.

Similarly, as shown in FIG. 2B, the distance between the two adjacent sensing electrodes along the horizontal direction in the second fingerprint pattern P2 is d1 and the distance between the two adjacent sensing electrodes along the vertical direction in the second fingerprint pattern P2 is d2, so that the ratio of the horizontal direction resolution and the vertical direction resolution of the second fingerprint pattern P2 is also d2:d1. As shown in FIG. 2C, the distance between the two adjacent sensing electrodes along the horizontal direction in the combined fingerprint pattern P3 is d1/2 and the distance between the two adjacent sensing electrodes along the vertical direction in the combined fingerprint pattern P3 is d2, so that the ratio of the horizontal direction resolution and the vertical direction resolution of the combined fingerprint pattern P3 is d2:(d1/2)=(2*d2):d1.

In this embodiment, when d1=(2*d2), namely the first distance d1 is twice of the second distance d2, the horizontal direction resolution and the vertical direction resolution of the combined fingerprint pattern P3 will be the same; when d1>(2*d2), namely the first distance d1 is larger than twice of the second distance d2, the horizontal direction resolution of the combined fingerprint pattern P3 will be smaller than the vertical direction resolution of the combined fingerprint pattern P3; when d1<(2*d2), namely the first distance d1 is smaller than twice of the second distance d2, the horizontal direction resolution of the combined fingerprint pattern P3 will be larger than the vertical direction resolution of the combined fingerprint pattern P3.

It should be noticed that self-capacitive sensing points of the first fingerprint pattern P1 and the mutual-capacitive sensing points of the second fingerprint pattern P2 are interlaced; therefore, at least one direction (e.g., the horizontal direction) resolution of the combined fingerprint pattern P3 will be larger than the at least one direction resolution of the first fingerprint pattern P1 and the second fingerprint pattern P2. In fact, the above-mentioned at least one direction is not limited to the horizontal direction, it can be also the vertical direction, the direction of 45 degree angle or the direction of ant other angles without any specific limitations.

Figure 3A:
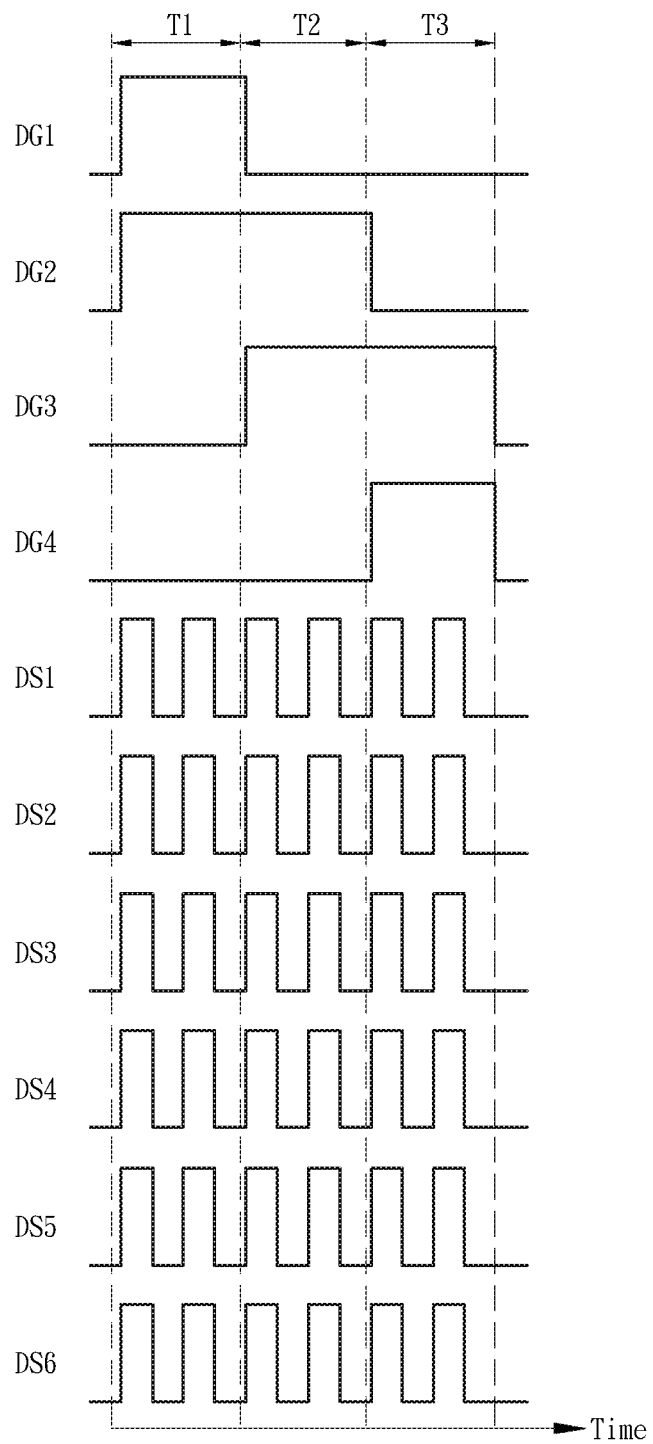
FIG. 3A illustrates a timing diagram of the scan driving signals and the sense driving signals when the capacitive fingerprint sensing apparatus is operated in the self-capacitive sensing mode.

Then, please refer to FIG. 3A. FIG. 3A is a timing diagram of the scan driving signals DG1~DG4 outputted by the scanning driver 10 and the sense driving signals DS1~DS6 outputted by the sensing driver 12 when the capacitive fingerprint sensing apparatus 1 is operated in the self-capacitive sensing mode. As shown in FIG. 3A, during the period of time T1, the scan driving signals DG1~DG2 outputted by the scanning driver 10 have a high level, but the scan driving signals DG3~DG4 have a low level. That is to say, during the period of time T1, the scanning driver 10 drives a pair of scanning lines G1~G2 among the scanning lines G1~G4 to perform a scanning on the first row of sensing electrodes E11~E16 and the second row of sensing electrodes E21~E26 and another two sensing lines G3~G4 are not driven. At this time, the sensing driver 12 outputs the sense driving signals DS1~DS6 to drive all sensing lines S1~S6 to perform self-capacitive sensing on all sensing electrodes E11~E46 to obtain the self-capacitive sensing points J11~J16 in the first fingerprint pattern P1 shown in FIG. 2A.

During the period of time T2, the scan driving signals DG2~DG3 outputted by the scanning driver 10 have the high level, but the scan driving signals DG1 and DG4 have the low level. That is to say, during the period of time T2, the scanning driver 10 drives another pair of scanning lines G2~G3 among the scanning lines G1~G4 to perform the scanning on the second row of sensing electrodes E21~E26 and the third row of sensing electrodes E31~E36 and another two sensing lines G1 and G4 are not driven. At this time, the sensing driver 12 outputs the sense driving signals DS1~DS6 to drive all sensing lines S1~S6 to perform self-capacitive sensing on all sensing electrodes E11~E46 to obtain the self-capacitive sensing points J21~J26 in the first fingerprint pattern P1 shown in FIG. 2A.

During the period of time T3, the scan driving signals DG3~DG4 outputted by the scanning driver 10 have the high level, but the scan driving signals DG1~DG2 have the low level. That is to say, during the period of time T3, the scanning driver 10 drives another pair of scanning lines G3~G4 among the scanning lines G1~G4 to perform the scanning on the third row of sensing electrodes E31~E36 and the fourth row of sensing electrodes E41~E46 and another two sensing lines G1~G2 are not driven. At this time, the sensing driver 12 outputs the sense driving signals DS1~DS6 to drive all sensing lines S1~S6 to perform self-capacitive sensing on all sensing electrodes E11~E46 to obtain the self-capacitive sensing points J31~J36 in the first fingerprint pattern P1 shown in FIG. 2A. Therefore, it can be found that after the periods of time T1~T3, all self-capacitive sensing points J11~J36 in the first fingerprint pattern P1 shown in FIG. 2A can be obtained.

Figure 3B:
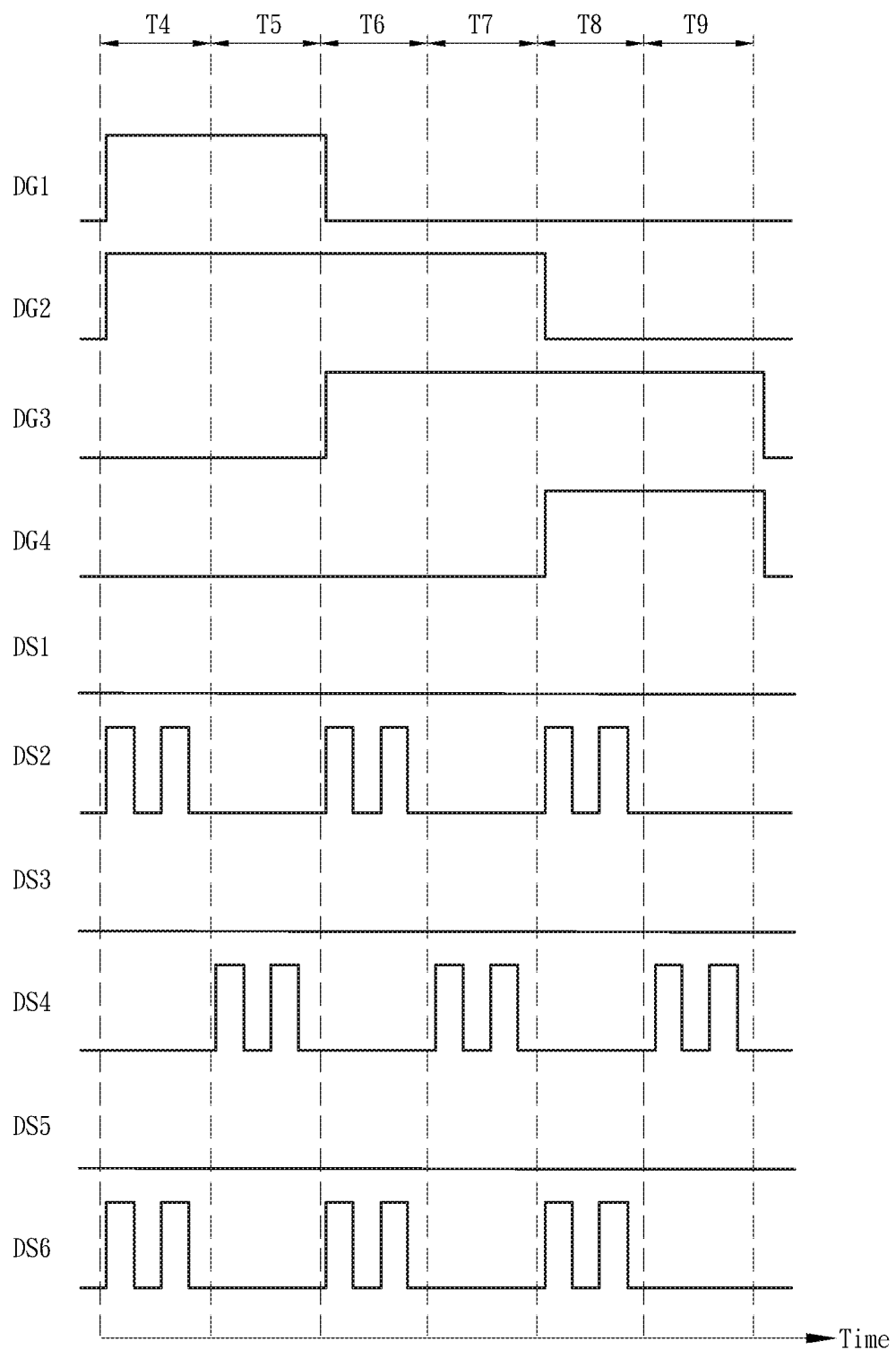
FIG. 3B illustrates a timing diagram of the scan driving signals and the sense driving signals when the capacitive fingerprint sensing apparatus is operated in the mutual-capacitive sensing mode.

Then, please refer to FIG. 3B. FIG. 3B illustrates a timing diagram of the scan driving signals outputted by the scanning driver 10 and the sense driving signals outputted by the sensing driver 12 when the capacitive fingerprint sensing apparatus 1 is operated in the mutual-capacitive sensing mode. As shown in FIG. 3B, during the period of time T4, the scan driving signals DG1~DG2 outputted by the scanning driver 10 have the high level, but the scan driving signals DG3~DG4 have the low level. That is to say, during the period of time T4, the scanning driver 10 drives a pair of scanning lines G1~G2 among the scanning lines G1~G4 to perform a scanning on the first row of sensing electrodes E11~E16 and the second row of sensing electrodes E21~E26 and another two sensing lines G3~G4 are not driven. At this time, the sensing driver 12 only outputs the sense driving signals DS2 and DS6 to drive the sensing lines S2 and S6 to select two adjacent sensing electrodes E12~E22 among the second row of the sensing electrodes E12~E42 to perform a mutual-capacitive sensing with the corresponding sensing electrodes E11~E21 among the adjacent first row of sensing electrodes E11~E41 and the corresponding sensing electrodes E13~E23 among the adjacent third row of sensing electrodes E13~E43 and also select two adjacent sensing electrodes E16~E26 among the sixth row of the sensing electrodes E16~E46 to perform the mutual-capacitive sensing with the corresponding sensing electrodes E15~E25 among the adjacent fifth row of sensing electrodes E15~E45 to obtain the mutual-capacitive sensing points M11~M12 and M15 in the second fingerprint pattern P2 shown in FIG. 2B.

During the period of time T5, the scan driving signals DG1~DG2 outputted by the scanning driver 10 have the high level, but the scan driving signals DG3~DG4 have the low level. That is to say, during the period of time T5, the scanning driver 10 still drives the pair of scanning lines G1~G2 among the scanning lines G1~G4 to perform the scanning on the first row of sensing electrodes E11~E16 and the second row of sensing electrodes E21~E26 and another two sensing lines G3~G4 are not driven. At this time, the sensing driver 12 only outputs the sense driving signal DS4 to drive the sensing line S4 to select two adjacent sensing electrodes E14~E24 among the fourth row of the sensing electrodes E14~E44 to perform the mutual-capacitive sensing with the corresponding sensing electrodes E13~E23 among the adjacent third row of sensing electrodes E13~E43 and the corresponding sensing electrodes E15~E25 among the adjacent fifth row of sensing electrodes E15~E45 to obtain the mutual-capacitive sensing points M13~M14 in the second fingerprint pattern P2 shown in FIG. 2B. Therefore, it can be found that after the periods of time T4~T5, all mutual-capacitive sensing points M11~M15 in the second fingerprint pattern P2 shown in FIG. 2B can be obtained.

Similarly, during the period of time T6, the scan driving signals DG2~DG3 outputted by the scanning driver 10 have the high level, but the scan driving signals DG1 and DG4 have the low level. That is to say, during the period of time T6, the scanning driver 10 drives another pair of scanning lines G2~G3 among the scanning lines G1~G4 to perform the scanning on the second row of sensing electrodes E21~E26 and the third row of sensing electrodes E31~E36 and another two sensing lines G3~G4 are not driven. At this time, the sensing driver 12 only outputs the sense driving signals DS2 and DS6 to drive the sensing lines S2 and S6 to select two adjacent sensing electrodes E22~E32 among the second row of the sensing electrodes E12~E42 to perform the mutual-capacitive sensing with the corresponding sensing electrodes E21~E31 among the adjacent first row of sensing electrodes E11~E41 and the corresponding sensing electrodes E23~E33 among the adjacent third row of sensing electrodes E13~E43 and select two adjacent sensing electrodes E26~E36 among the sixth row of the sensing electrodes E16~E46 to perform the mutual-capacitive sensing with the corresponding sensing electrodes E25~E35 among the adjacent fifth row of sensing electrodes E15~E45 to obtain the mutual-capacitive sensing points M21~M22 and M25 in the second fingerprint pattern P2 shown in FIG. 2B.

During the period of time T7, the scan driving signals DG2~DG3 outputted by the scanning driver 10 have the high level, but the scan driving signals DG1 and DG4 have the low level. That is to say, during the period of time T7, the scanning driver 10 still drives another pair of scanning lines G2~G3 among the scanning lines G1~G4 to perform the scanning on the second row of sensing electrodes E21~E26 and the third row of sensing electrodes E31~E36 and another two sensing lines G3~G4 are not driven. At this time, the sensing driver 12 only outputs the sense driving signal DS4 to drive the sensing line S4 to select two adjacent sensing electrodes E24~E34 among the fourth row of the sensing electrodes E14~E44 to perform the mutual-capacitive sensing with the corresponding sensing electrodes E23~E33 among the adjacent third row of sensing electrodes E13~E43 and the corresponding sensing electrodes E25~E35 among the adjacent fifth row of sensing electrodes E15~E45 to obtain the mutual-capacitive sensing points M23~M24 in the second fingerprint pattern P2 shown in FIG. 2B. Therefore, it can be found that after the periods of time T6~T7, the mutual-capacitive sensing points M21~M25 in the second fingerprint pattern P2 shown in FIG. 2B can be obtained. Similarly, after the periods of time T8~T9, the mutual-capacitive sensing points M31~M35 in the second fingerprint pattern P2 shown in FIG. 2B can be obtained.

Above all, after the capacitive fingerprint sensing apparatus 1 is operated in the mutual-capacitive sensing mode during the periods of time T4~T9, all the mutual-capacitive sensing points M11~M35 in the second fingerprint pattern P2 shown in FIG. 2B can be obtained.

Figure 4:
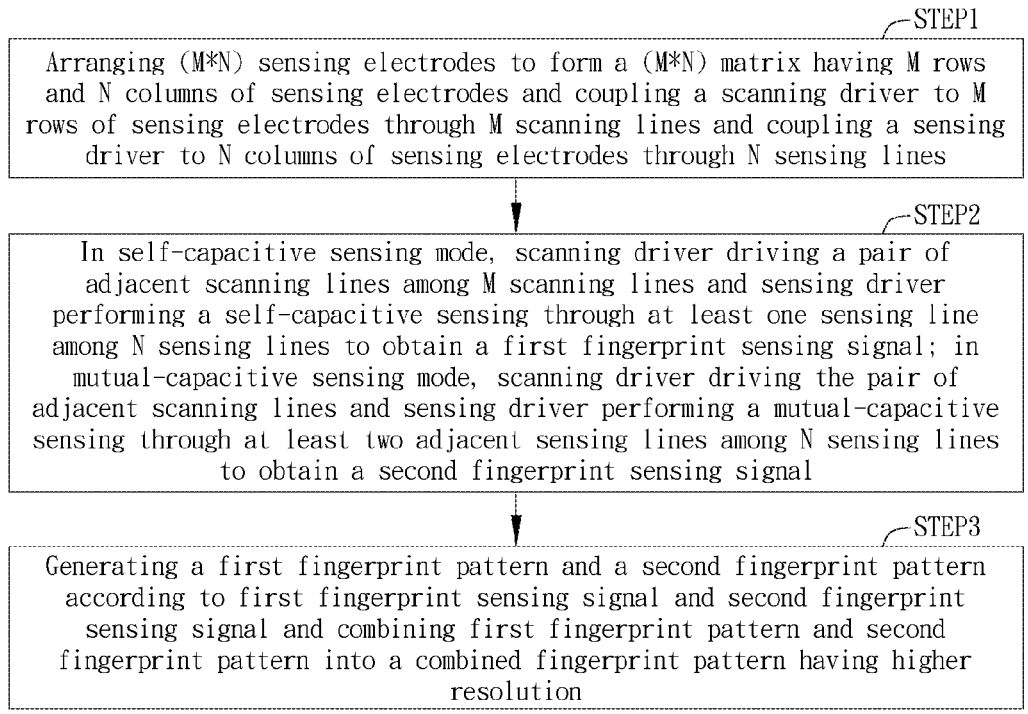
FIG. 4 illustrates a flowchart of the capacitive fingerprint sensing method in a second preferred embodiment of the invention.

Please refer to FIG. 4. FIG. 4 illustrates a flowchart of the capacitive fingerprint sensing method in a second preferred embodiment of the invention. In this embodiment, the capacitive fingerprint sensing method is applied in a self-capacitive sensing mode or a mutual-capacitive sensing mode. As shown in FIG. 4, in STEP 1, the capacitive fingerprint sensing method arranges (M*N) sensing electrodes to form a (M*N) matrix having M rows of sensing electrodes and N columns of sensing electrodes and couples a scanning driver to the M rows of sensing electrodes respectively through M scanning lines and couples a sensing driver to the N columns of sensing electrodes respectively through N sensing lines, wherein M and N are both positive integers. Then, the capacitive fingerprint sensing method performs STEP 2, in the self-capacitive sensing mode, the scanning driver drives a pair of adjacent scanning lines among the M scanning lines and the sensing driver performs a self-capacitive sensing through at least one sensing line among the N sensing lines to obtain a first fingerprint sensing signal; in the mutual-capacitive sensing mode, the scanning driver drives the pair of adjacent scanning lines and the sensing driver performs a mutual-capacitive sensing through at least two adjacent sensing lines among the N sensing lines to obtain a second fingerprint sensing signal. At last, in STEP 3, the capacitive fingerprint sensing method generates a first fingerprint pattern and a second fingerprint pattern according to the first fingerprint sensing signal and the second fingerprint sensing signal and combines the first fingerprint pattern and the second fingerprint pattern into a combined fingerprint pattern having higher resolution.

Figure 5:
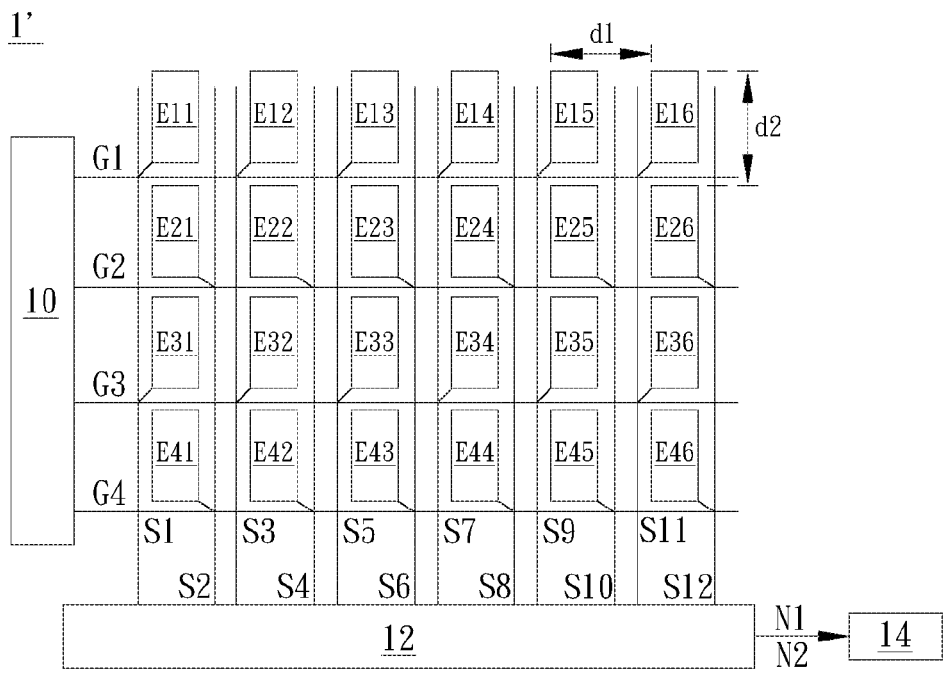
FIG. 5 illustrates a schematic diagram of the capacitive fingerprint sensing apparatus in a third preferred embodiment of the invention.

A third preferred embodiment of the invention is also a capacitive fingerprint sensing apparatus. In this embodiment, the capacitive fingerprint sensing apparatus can be operated in the self-capacitive sensing mode or the mutual-capacitive sensing mode. As shown in FIG. 5, the capacitive fingerprint sensing apparatus 1' includes sensing electrodes E11~E46, a scanning driver 10, a sensing driver 12 and a processing module 14. Wherein, the sensing electrodes E11~E46 are arranged in a form of (4*6) matrix including four rows of sensing electrodes and six columns of sensing electrodes. The scanning driver 10 is coupled to the first row of sensing electrodes E11~E16, the second row of sensing electrodes E21~E26, the third row of sensing electrodes E31~E36 and the fourth row of sensing electrodes E41~E46 through the scanning lines G1~G4 respectively. Different from the above-mentioned embodiments, the sensing driver 12 of this embodiment is coupled to the first column of sensing electrodes E11~E41, the second column of sensing electrodes E12~E42, the third column of sensing electrodes E13~E43, the fourth column of sensing electrodes E14~E44, the fifth column of sensing electrodes E15~E45 and the sixth column of sensing electrodes E16~E46 through sensing lines S1~S6 through the first pair of sensing lines S1~S2, the second pair of sensing lines S3~S4, the third pair of sensing lines S5~S6, the fourth pair of sensing lines S7~S8, the fifth pair of sensing lines S9~S10 and the sixth pair of sensing lines S11~S12 respectively.

Taking the first pair of sensing lines S1~S2 for example in this embodiment, the first pair of sensing lines S1~S2 includes two sensing lines S1 and S2, wherein the sensing line S1 is coupled to the odd sensing electrodes E11 and E31 among the first column of sensing electrodes E11~E41 respectively, and the sensing line S1 is also coupled to the odd scanning lines G1 and G3 respectively; the sensing line S2 is coupled to the even sensing electrodes E21 and E41 among the first column of sensing electrodes E11~E41 respectively, and the sensing line S2 is also coupled to the even scanning lines G2 and G4 respectively.

In fact, the coupling relationship between the first pair of sensing lines S1~S2 and the first column of sensing electrodes E11~E41 can be also that the sensing line S2 is coupled to the odd sensing electrodes E11 and E31 among the first column of sensing electrodes E11~E41 respectively, and the sensing line S2 is also coupled to the odd scanning lines G1 and G3 respectively; the sensing line S1 is coupled to the even sensing electrodes E21 and E41 among the first column of sensing electrodes E11~E41 respectively, and the sensing line S1 is also coupled to the even scanning lines G2 and G4 respectively. Similarly, taking the second pair of sensing lines S3~S4 for example in this embodiment, the second pair of sensing lines S3~S4 includes two sensing lines S3 and S4, wherein the sensing line S3 is coupled to the odd sensing electrodes E12 and E32 among the second column of sensing electrodes E12~E42 respectively, and the sensing line S3 is also coupled to the odd scanning lines G1 and G3 respectively; the sensing line S4 is coupled to the even sensing electrodes E22 and E42 among the second column of sensing electrodes E12~E42 respectively, and the sensing line S4 is also coupled to the even scanning lines G2 and G4 respectively. The other pairs of sensing lines including the third pair of sensing lines S5~S6, the fourth pair of sensing lines S7~S8, the fifth pair of sensing lines S9~S10 and the sixth pair of sensing lines S11~S12 are also similar to the above-mentioned embodiments.

When the capacitive fingerprint sensing apparatus 1' is operated in the self-capacitive sensing mode, the scanning driver 10 will drive the odd scanning lines G1 and G3 and the even scanning lines G2 and G4 among the scanning lines G1~G4 respectively, and the sensing driver 12 will use at least one sensing line (e.g., the sensing line S1) among the sensing lines S1~S12 to perform self-capacitive sensing on the sensing electrode (e.g., E11 or E31) coupled to the at least one sensing line to obtain a first fingerprint sensing signal N1; when the capacitive fingerprint sensing apparatus 1' is operated in the mutual-capacitive sensing mode, the scanning driver 10 will drive a pair of adjacent scanning lines (e.g., the adjacent scanning lines G1 and G2) and the sensing driver 12 will use one pair of sensing lines (e.g., the sensing lines S1 and S2) among the six pairs of sensing lines to sense the mutual-capacity between the column of sensing electrodes (e.g., the first column of sensing electrodes E11~E41) coupled to the pair of sensing lines and its adjacent column of sensing electrodes to obtain the second fingerprint sensing signal N2. Then, the processing module 14 will obtain a first fingerprint pattern P1 and a second fingerprint pattern P2 according to the first fingerprint sensing signal N1 and the second fingerprint sensing signal N2 respectively and combine the first fingerprint pattern P1 and the second fingerprint pattern P2 into a combined fingerprint pattern P3.

Figure 6A:
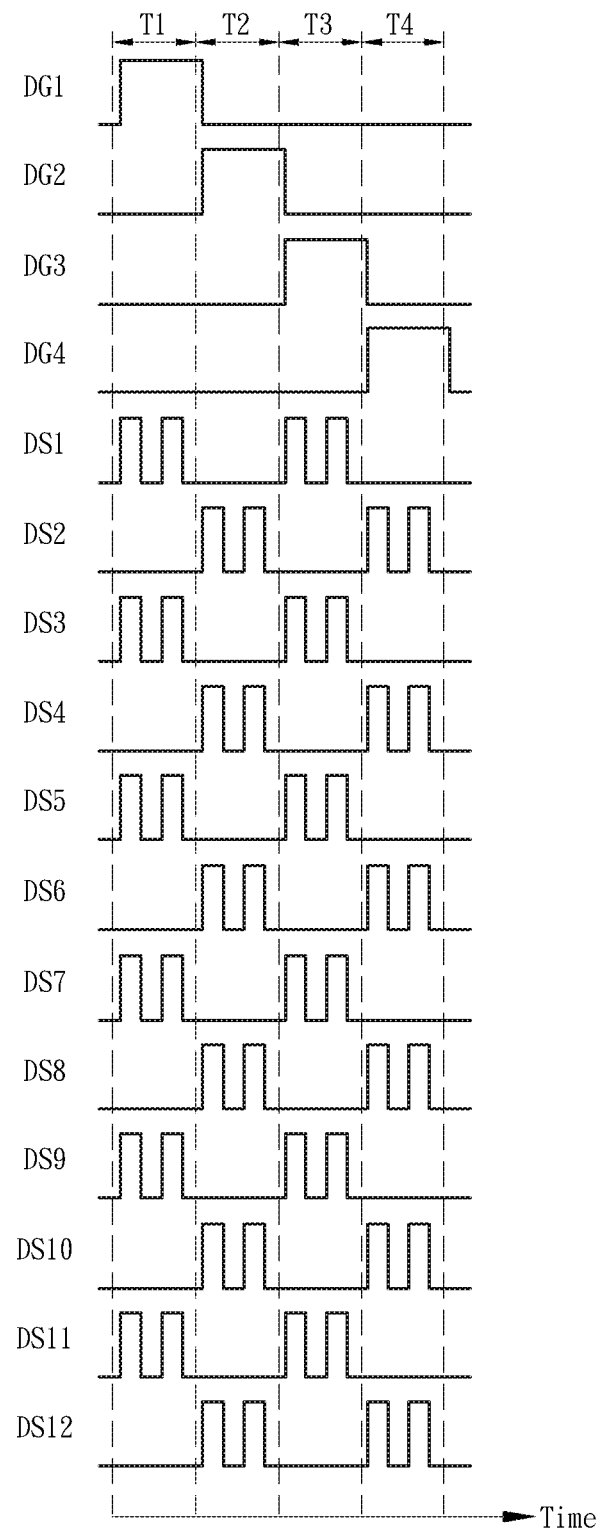
FIG. 6A illustrates a timing diagram of the scan driving signals and the sense driving signals when the capacitive fingerprint sensing apparatus is operated in the self-capacitive sensing mode.

Then, please refer to FIG. 6A. FIG. 6A is a timing diagram of the scan driving signals DG1~DG4 outputted by the scanning driver 10 and the sense driving signals DS1~DS12 outputted by the sensing driver 12 when the capacitive fingerprint sensing apparatus 1' is operated in the self-capacitive sensing mode. As shown in FIG. 6A, during the period of time T1, the scan driving signal DG1 outputted by the scanning driver 10 have a high level, but the scan driving signals DG2~DG4 have a low level. That is to say, during the period of time T1, the scanning driver 10 only drives one scanning line G1 among the scanning lines G1~G4 to perform a scanning on the first row of sensing electrodes E11~E16 and another three sensing lines G2~G4 are not driven. At this time, the sensing driver 12 outputs the sense driving signals DS1, DS3, DS5, DS7, DS9 and DS11 to drive the odd sensing lines S1, S3, S5, S7, S9 and S11 coupled to the scanning line G1 to perform self-capacitive sensing on each sensing electrode of the first row of sensing electrodes E11~E16 respectively.

During the period of time T2, the scan driving signal DG2 outputted by the scanning driver 10 has the high level, but the scan driving signals DG1 and DG3~DG4 have the low level. That is to say, during the period of time T2, the scanning driver 10 only drives another one scanning line G2 among the scanning lines G1~G4 to perform the scanning on the second row of sensing electrodes E21~E26 and another three sensing lines G1 and G3~G4 are not driven. At this time, the sensing driver 12 outputs the sense driving signals DS2, DS4, DS6, DS8, DS10 and DS12 to drive the even sensing lines S2, S4, S6, S8, S10 and S12 coupled to the scanning line G2 to perform self-capacitive sensing on each sensing electrode among the second row of sensing electrodes E21~E26 respectively.

Similarly, during the period of time T3, the scan driving signal DG3 outputted by the scanning driver 10 have a high level, but the scan driving signals DG1~DG2 and DG4 have a low level. That is to say, during the period of time T3, the scanning driver 10 only drives one scanning line G3 among the scanning lines G1~G4 to perform a scanning on the third row of sensing electrodes E31~E36 and another three sensing lines G1~G2 and G4 are not driven. At this time, the sensing driver 12 outputs the sense driving signals DS1, DS3, DS5, DS7, DS9 and DS11 to drive the odd sensing lines S1, S3, S5, S7, S9 and S11 coupled to the scanning line G3 to perform self-capacitive sensing on each sensing electrode among the third row of sensing electrodes E31~E36 respectively. Similarly, during the period of time T4, the scan driving signal DG4 outputted by the scanning driver 10 has the high level, but the scan driving signals DG1~DG3 have the low level. That is to say, during the period of time T4, the scanning driver 10 only drives another one scanning line G4 among the scanning lines G1~G4 to perform the scanning on the fourth row of sensing electrodes E41~E46 and another three sensing lines G1~G3 are not driven. At this time, the sensing driver 12 outputs the sense driving signals DS2, DS4, DS6, DS8, DS10 and DS12 to drive the even sensing lines S2, S4, S6, S8, S10 and S12 coupled to the scanning line G4 to perform self-capacitive sensing on each sensing electrode among the second row of sensing electrodes E41~E46 respectively.

After the periods of time T1~T4, the capacitive fingerprint sensing apparatus 1' operated in the self-capacitive sensing mode can finish the self-capacitive sensing on all sensing electrodes E11~E46 and obtain the first fingerprint sensing signal N1.

Figure 6B:
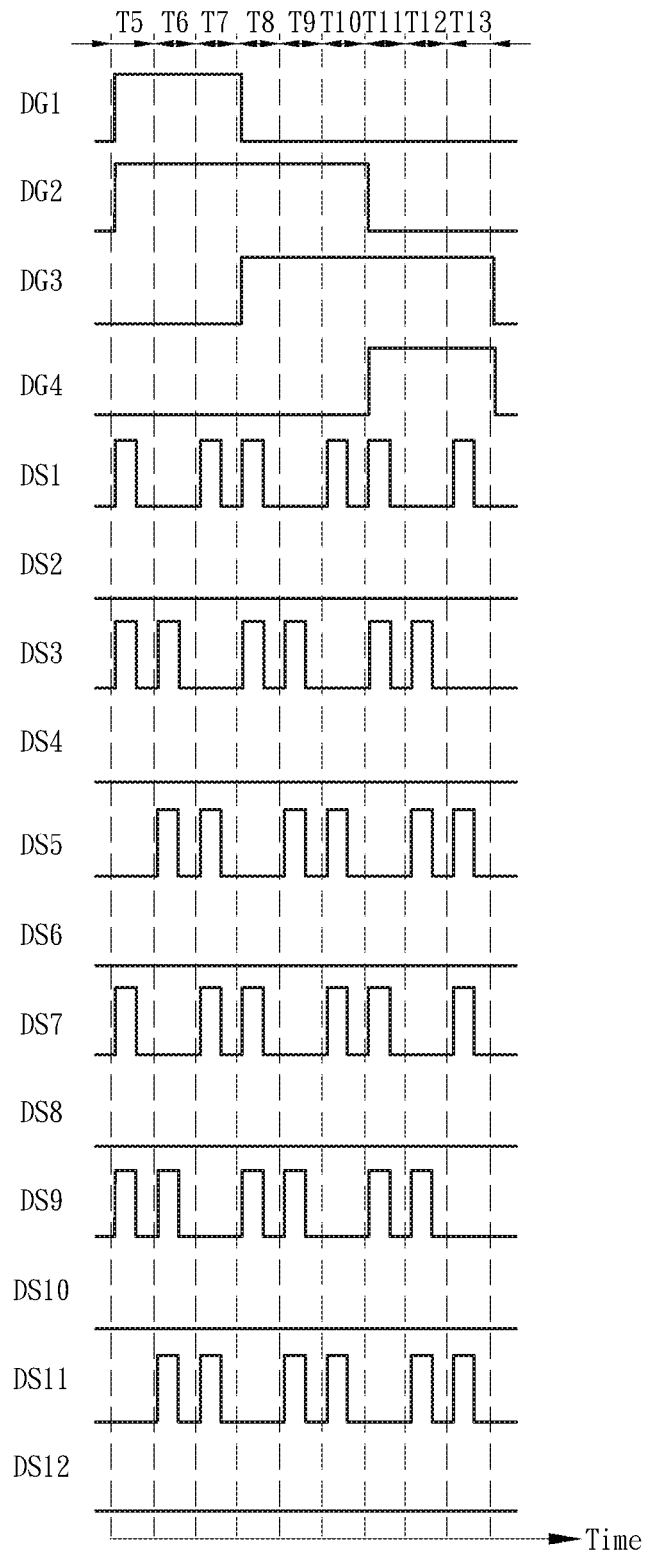
FIG. 6B illustrates a timing diagram of the scan driving signals and the sense driving signals when the capacitive fingerprint sensing apparatus is operated in the mutual-capacitive sensing mode.

Then, please refer to FIG. 6B. FIG. 6B illustrates a timing diagram of the scan driving signals DG1~DG4 outputted by the scanning driver 10 and the sense driving signals DS1~DS12 outputted by the sensing driver 12 when the capacitive fingerprint sensing apparatus 1' is operated in the mutual-capacitive sensing mode. As shown in FIG. 6B, during the periods of time T5~T7, the scan driving signals DG1~DG2 outputted by the scanning driver 10 have the high level, but the scan driving signals DG3~DG4 have the low level. That is to say, during the periods of time T5~T7, the scanning driver 10 drives a pair of scanning lines G1~G2 among the scanning lines G1~G4 to perform a scanning on the first row of sensing electrodes E11~E16 and the second row of sensing electrodes E21~E26 and another two sensing lines G3~G4 are not driven.

During the period of time T5, the sensing driver 12 only outputs the sense driving signals DS1, DS3, DS7 and DS9 to drive the corresponding sensing lines S1, S3, S7 and S9 to select a pair of adjacent sensing electrodes E11~E12 among the first column of the sensing electrodes to perform a mutual-capacitive sensing with the corresponding pair of adjacent sensing electrodes E21~E22 among the second column of the sensing electrodes and also select another pair of adjacent sensing electrodes E14~E15 among the first column of the sensing electrodes to perform the mutual-capacitive sensing with the corresponding pair of adjacent sensing electrodes E24~E25 among the second column of the sensing electrodes. During the period of time T6, the sensing driver 12 only outputs the sense driving signals DS3, DS5, DS9 and DS11 to drive the corresponding sensing lines S3, S5, S9 and S11 to select a pair of adjacent sensing electrodes E12~E13 among the first column of the sensing electrodes to perform a mutual-capacitive sensing with the corresponding pair of adjacent sensing electrodes E22~E23 among the second column of the sensing electrodes and also select another pair of adjacent sensing electrodes E15~E16 among the first column of the sensing electrodes to perform the mutual-capacitive sensing with the corresponding pair of adjacent sensing electrodes E25~E26 among the second column of the sensing electrodes. During the period of time T7, the sensing driver 12 only outputs the sense driving signals DS1, DS5, DS7 and DS11 to drive the corresponding sensing lines S1, S5, S7 and S11 to select the sensing electrode E11 among the first column of the sensing electrodes to perform a mutual-capacitive sensing with the corresponding adjacent sensing electrode E21 among the second column of the sensing electrodes, select another pair of adjacent sensing electrodes E13~E14 among the first column of the sensing electrodes to perform the mutual-capacitive sensing with the corresponding pair of adjacent sensing electrodes E23~E24 among the second column of the sensing electrodes, and also select the sensing electrode E16 among the first column of the sensing electrodes to perform a mutual-capacitive sensing with the corresponding adjacent sensing electrode E26 among the second column of the sensing electrodes.

Similarly, during the periods of time T8~T10, the scan driving signals DG2~DG3 outputted by the scanning driver 10 have the high level, but the scan driving signals DG1 and DG4 have the low level. That is to say, during the periods of time T8~T10, the scanning driver 10 drives a pair of scanning lines G2~G3 among the scanning lines G1~G4 to perform a scanning on the second row of sensing electrodes E21~E26 and the third row of sensing electrodes E31~E36 and another two sensing lines G1 and G4 are not driven. During the period of time T8, the sensing driver 12 only outputs the sense driving signals DS1, DS3, DS7 and DS9 to drive the corresponding sensing lines S1, S3, S7 and S9 to select a pair of adjacent sensing electrodes E31~E32 among the third column of the sensing electrodes to perform a mutual-capacitive sensing with the corresponding pair of adjacent sensing electrodes E21~E22 among the second column of the sensing electrodes and also select another pair of adjacent sensing electrodes E34~E35 among the third column of the sensing electrodes to perform the mutual-capacitive sensing with the corresponding pair of adjacent sensing electrodes E24~E25 among the second column of the sensing electrodes. During the period of time T9, the sensing driver 12 only outputs the sense driving signals DS3, DS5, DS9 and DS11 to drive the corresponding sensing lines S3, S5, S9 and S11 to select a pair of adjacent sensing electrodes E32~E33 among the third column of the sensing electrodes to perform a mutual-capacitive sensing with the corresponding pair of adjacent sensing electrodes E22~E23 among the second column of the sensing electrodes and also select another pair of adjacent sensing electrodes E35~E36 among the third column of the sensing electrodes to perform the mutual-capacitive sensing with the corresponding pair of adjacent sensing electrodes E25~E26 among the second column of the sensing electrodes. During the period of time T10, the sensing driver 12 only outputs the sense driving signals DS1, DS5, DS7 and DS11 to drive the corresponding sensing lines S1, S5, S7 and S11 to select the sensing electrode E31 among the third column of the sensing electrodes to perform a mutual-capacitive sensing with the corresponding adjacent sensing electrode E21 among the second column of the sensing electrodes, select another pair of adjacent sensing electrodes E33~E34 among the third column of the sensing electrodes to perform the mutual-capacitive sensing with the corresponding pair of adjacent sensing electrodes E23~E24 among the second column of the sensing electrodes, and also select the sensing electrode E36 among the third column of the sensing electrodes to perform a mutual-capacitive sensing with the corresponding adjacent sensing electrode E26 among the second column of the sensing electrodes.

Similarly, during the periods of time T11~T13, the scan driving signals DG3~DG4 outputted by the scanning driver 10 have the high level, but the scan driving signals DG1~DG2 have the low level. That is to say, during the periods of time T11~T13, the scanning driver 10 drives a pair of scanning lines G3~G4 among the scanning lines G1~G4 to perform a scanning on the third row of sensing electrodes E31~E36 and the fourth row of sensing electrodes E41~E46 and another two sensing lines G1~G2 are not driven. During the period of time T11, the sensing driver 12 only outputs the sense driving signals DS1, DS3, DS7 and DS9 to drive the corresponding sensing lines S1, S3, S7 and S9 to select a pair of adjacent sensing electrodes E31~E32 among the third column of the sensing electrodes to perform a mutual-capacitive sensing with the corresponding pair of adjacent sensing electrodes E41~E42 among the fourth column of the sensing electrodes and also select another pair of adjacent sensing electrodes E34~E35 among the third column of the sensing electrodes to perform the mutual-capacitive sensing with the corresponding pair of adjacent sensing electrodes E44~E45 among the fourth column of the sensing electrodes. During the period of time T12, the sensing driver 12 only outputs the sense driving signals DS3, DS5, DS9 and DS11 to drive the corresponding sensing lines S3, S5, S9 and S11 to select a pair of adjacent sensing electrodes E32~E33 among the third column of the sensing electrodes to perform a mutual-capacitive sensing with the corresponding pair of adjacent sensing electrodes E42~E43 among the fourth column of the sensing electrodes and also select another pair of adjacent sensing electrodes E35~E36 among the third column of the sensing electrodes to perform the mutual-capacitive sensing with the corresponding pair of adjacent sensing electrodes E45~E46 among the fourth column of the sensing electrodes. During the period of time T13, the sensing driver 12 only outputs the sense driving signals DS1, DS5, DS7 and DS11 to drive the corresponding sensing lines S1, S5, S7 and S11 to select the sensing electrode E31 among the third column of the sensing electrodes to perform a mutual-capacitive sensing with the corresponding adjacent sensing electrode E41 among the fourth column of the sensing electrodes, select another pair of adjacent sensing electrodes E33~E34 among the third column of the sensing electrodes to perform the mutual-capacitive sensing with the corresponding pair of adjacent sensing electrodes E43~E44 among the fourth column of the sensing electrodes, and also select the sensing electrode E36 among the third column of the sensing electrodes to perform a mutual-capacitive sensing with the corresponding adjacent sensing electrode E46 among the fourth column of the sensing electrodes.

After the periods of time T5~T13, the capacitive fingerprint sensing apparatus 1' operated in the mutual-capacitive sensing mode can finish the mutual-capacitive sensing on all sensing electrodes E11~E46 and obtain the second fingerprint sensing signal N2. At last, the processing module 14 will obtain a first fingerprint pattern P1 and a second fingerprint pattern P2 according to the first fingerprint sensing signal N1 and the second fingerprint sensing signal N2 respectively and combine the first fingerprint pattern P1 and the second fingerprint pattern P2 into a combined fingerprint pattern P3 having higher resolution.

Figure 7:
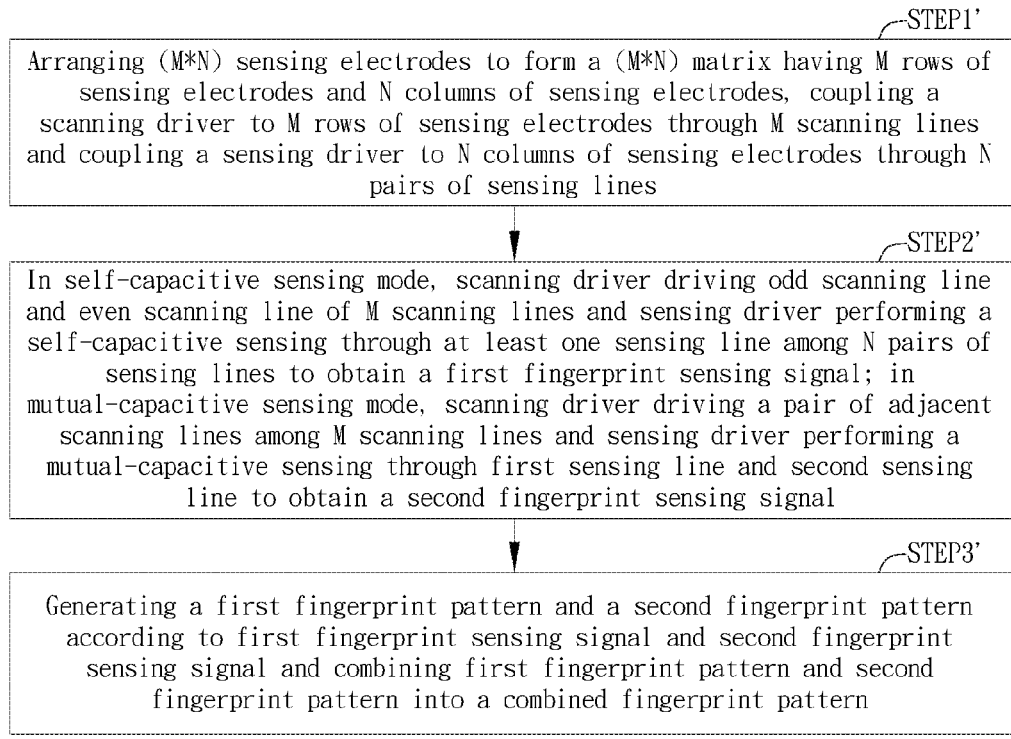
FIG. 7 illustrates a flowchart of the capacitive fingerprint sensing method in a fourth preferred embodiment of the invention.

Then, please refer to FIG. 7. FIG. 7 illustrates a flowchart of the capacitive fingerprint sensing method in a fourth preferred embodiment of the invention. In this embodiment, the capacitive fingerprint sensing method is applied in a self-capacitive sensing mode or a mutual-capacitive sensing mode. As shown in FIG. 7, in STEP 1', the method arranges (M*N) sensing electrodes to form a (M*N) matrix having M rows of sensing electrodes and N columns of sensing electrodes, couples a scanning driver to the M rows of sensing electrodes respectively through M scanning lines and couples a sensing driver to the N columns of sensing electrodes respectively through N pairs of sensing lines, wherein a pair of sensing lines among the N pairs of sensing lines is coupled to a column of sensing electrodes among the N columns of sensing electrodes, the pair of sensing lines includes a first sensing line and a second sensing line, the first sensing line is coupled to an odd sensing electrode among the column of sensing electrodes and the second sensing line is coupled to an even sensing electrode among the column of sensing electrodes, or the second sensing line is coupled to the odd sensing electrode among the column of sensing electrodes and the first sensing line is coupled to the even sensing electrode among the column of sensing electrodes; the first sensing line is coupled to an odd scanning line among the M scanning lines and the second sensing line is coupled to an even scanning line among the M scanning lines, or the second sensing line is coupled to the odd scanning line among the M scanning lines and the first sensing line is coupled to the even scanning line among the M scanning lines, M and N are both positive integers.

Then, the method performs STEP 2', in the self-capacitive sensing mode, the scanning driver drives the odd scanning line and the even scanning line among the M scanning lines and the sensing driver performs a self-capacitive sensing through at least one sensing line among the N pairs of sensing lines to obtain a first fingerprint sensing signal; in the mutual-capacitive sensing mode, the scanning driver drives a pair of adjacent scanning lines among the M scanning lines and the sensing driver performs a mutual-capacitive sensing through the first sensing line and the second sensing line to obtain a second fingerprint sensing signal. At last, in STEP 3', the method generates a first fingerprint pattern and a second fingerprint pattern according to the first fingerprint sensing signal and the second fingerprint sensing signal and combines the first fingerprint pattern and the second fingerprint pattern into a combined fingerprint pattern.

Then, please refer to FIG. 8A~FIG. 8C. FIG. 8A~FIG. 8C illustrate different sensing electrode arrangements respectively. As shown in FIG. 8A~FIG. 8C, the sensing electrodes E11~E44 are arranged in different regular arranging ways and have different sizes and shapes respectively. In practical applications, the sensing electrodes can have arbitrary geometry and they can have the same or different sizes and shapes respectively without any specific limitations. In addition, the angle between any two adjacent sensing electrodes can be any angles without any specific limitations.

Please also refer to FIG. 9A and FIG. 9B. FIG. 9A illustrates a schematic diagram of the sensing driver coupled to the processing module though the switching module and the amplifying module; FIG. 9B illustrates a schematic diagram of the sensing driver coupled to the processing module though the switching module. As shown in FIG. 9A, the capacitive fingerprint sensing apparatus 1 can further include a switching module 16 and an amplifying module 18. The switching module 16 and the amplifying module 18 are coupled between the sensing driver 12 and the processing module 14. The switching module 16 selectively switches between the self-capacitive sensing mode and the mutual-capacitive sensing mode and transmits the first fingerprint sensing signal N1 and the second fingerprint sensing signal N2 to the amplifying module 18, and the first fingerprint sensing signal N1 and the second fingerprint sensing signal N2 are amplified by the amplifying module 18 and then transmitted to the processing module 14. The processing module 14 can be further coupled to a host 2. After the processing module 14 obtains the first fingerprint pattern P1 and the second fingerprint pattern P2 according to the first fingerprint sensing signal N1 and the second fingerprint sensing signal N2 respectively and combines the first fingerprint pattern P1 and the second fingerprint pattern P2 into the combined fingerprint pattern P3, the processing module 14 can transmit the combined fingerprint pattern P3 to the host 2.

As shown in FIG. 9B, if the capacitive fingerprint sensing apparatus 1 does not include any amplifying module, the switching module 16 can use the mode switching unit 180 to selectively switch to the self-capacitive sensing mode or the mutual-capacitive sensing mode and directly transmit the first fingerprint sensing signal N1 and the second fingerprint sensing signal N2 to the processing module 14. The processing module 14 can be further coupled to the host 2. After the processing module 14 obtains the first fingerprint pattern P1 and the second fingerprint pattern P2 according to the first fingerprint sensing signal N1 and the second fingerprint sensing signal N2 respectively and combines the first fingerprint pattern P1 and the second fingerprint pattern P2 into the combined fingerprint pattern P3, the processing module 14 can transmit the combined fingerprint pattern P3 to the host 2.

A fifth preferred embodiment of the invention is also a capacitive fingerprint sensing apparatus. In this embodiment, the capacitive fingerprint sensing apparatus can be operated in the self-capacitive sensing mode or the mutual-capacitive sensing mode. Please refer to FIG. 10. FIG. 10 illustrates a schematic diagram of the capacitive fingerprint sensing apparatus in this embodiment. As shown in FIG. 10, the capacitive fingerprint sensing apparatus 1" includes a plurality of sensing electrodes E11~E45, a scanning driver 10, a sensing driver 12 and a processing module 14. The sensing electrodes E11~E45 are arranged to form four rows of sensing electrodes E11~E15, E21~E25, E31~E35 and E41~E45 along the first direction (the horizontal direction) and five columns of sensing electrodes E11~E41, E12~E42, E13~E43, E14~E44 and E15~E45 along the second direction (the vertical direction) respectively. It should be noticed that odd sensing electrodes and even sensing electrodes in each column of sensing electrodes are interlaced.

For example, in the first column of sensing electrodes E11~E41, the odd sensing electrodes E11 and E31 and the even sensing electrodes E21 and E41 are interlaced. That is to say, in the first column of sensing electrodes E11~E41, the sensing electrode E11 will be aligned to the sensing electrode E31 but not aligned to the sensing electrodes E21 and E41, and so on. In addition, for two adjacent rows of sensing electrodes, taking the first row of sensing electrodes E11~E15 and the second row of sensing electrodes E21~E25 for example, the sensing electrode E12 in the first row of sensing electrodes E11~E15 and the sensing electrodes E21 and E22 in the second row of sensing electrodes E21~E25 will form a triangle electrode arrangement, and the sensing electrodes E14 and E15 in the first row of sensing electrodes E11~E15 and the sensing electrode E24 in the second row of sensing electrodes E21~E25 will also form another triangle electrode arrangement, and so on.

In this embodiment, the scanning driver 10 will be coupled to the four rows of sensing electrodes E11~E15, E21~E25, E31~E35, and E41~E45 through the scanning lines G1~G4 respectively. The sensing driver 12 are coupled to the five columns of sensing electrodes E11~E41, E12~E42, E13~E43, E14~E44 and E15~E45 through the five pairs of sensing lines S1~S2, S3~S4, S5~S6, S7~S8 and S9~S10 respectively. Taking the first pair of sensing lines S1~S2 for example, the first pair of sensing lines S1~S2 includes two sensing lines S1 and S2, wherein the sensing line S1 is coupled to the odd sensing electrodes E11 and E31 among the first column of sensing electrodes E11~E41 respectively, and the sensing line S1 is also coupled to the odd scanning lines G1 and G3 respectively; the sensing line S2 is coupled to the even sensing electrodes E21 and E41 among the first column of sensing electrodes E11~E41 respectively, and the sensing line S2 is also coupled to the even scanning lines G2 and G4 respectively. In fact, it can be also that the sensing line S2 is coupled to the odd sensing electrodes E11 and E31 among the first column of sensing electrodes E11~E41 respectively, and the sensing line S2 is also coupled to the odd scanning lines G1 and G3 respectively; the sensing line S1 is coupled to the even sensing electrodes E21 and E41 among the first column of sensing electrodes E11~E41 respectively, and the sensing line S1 is also coupled to the even scanning lines G2 and G4 respectively.

When the capacitive fingerprint sensing apparatus 1" is operated in the self-capacitive sensing mode, the scanning driver 10 will drive the scanning lines G1~G4 line by line in order, and the sensing driver 12 will use at least one sensing line (e.g., the sensing line S1) among the five pairs of sensing lines S1~S2, S3~S4, S5~S6, S7~S8 and S9~S10 to perform self-capacitive sensing on the sensing electrode E11 or E31 coupled to the at least one sensing line to obtain a first fingerprint sensing signal N1. When the capacitive fingerprint sensing apparatus 1″ is operated in the first mutual-capacitive sensing mode, the scanning driver 10 will drive the scanning lines G1~G4 line by line in order and the sensing driver 12 will select the sensing electrodes (e.g., E12 and E14) coupled by the even sensing lines (e.g., S3 and S7) among the sensing lines (e.g., S1, S3, S5, S7, S9) coupled to the driven scanning line (e.g., G1) and the sensing electrodes (e.g., E11, E13 and E15) coupled by the odd sensing lines (e.g., S1, S5 and S9) among the sensing lines (e.g., S1, S3, S5, S7, S9) coupled to the driven scanning line (e.g., G1) as the signal transmitter (TX) and the signal receiver (RX) respectively to perform mutual-capacitive sensing along the horizontal direction to obtain the second fingerprint sensing signal N2. When the capacitive fingerprint sensing apparatus 1″ is operated in the second mutual-capacitive sensing mode, the scanning driver 10 will drive a pair of adjacent scanning lines (e.g., G1 and G2) among the scanning lines G1~G4 and the sensing driver 12 will select one sensing electrode (e.g., E12) among a row of sensing electrodes (e.g., the first row of sensing electrodes E11~E15) coupled by the driven pair of adjacent scanning lines (e.g., G1 and G2) as the signal transmitter (TX) and select two corresponding sensing electrodes (e.g., E21 and E22) among another row of sensing electrodes (e.g., the second row of sensing electrodes E21~E25) also coupled by the driven pair of adjacent scanning lines (e.g., G1 and G2) as the signal receiver (RX) respectively to perform mutual-capacitive sensing along the vertical direction to obtain the third fingerprint sensing signal N3.

It should be noticed that, in practical applications, when the capacitive fingerprint sensing apparatus 1″ is operated in the second mutual-capacitive sensing mode, the sensing driver 12 can select at least one sensing electrode (e.g., one sensing electrode or adjacent sensing electrodes) among a row of sensing electrodes coupled by the driven pair of adjacent scanning lines and select at least one corresponding sensing electrode (e.g., one sensing electrode or adjacent sensing electrodes) among another row of sensing electrodes also coupled by the driven pair of adjacent scanning lines as the signal transmitter (TX) and the signal receiver (RX) respectively to perform mutual-capacitive sensing to obtain the third fingerprint sensing signal N3 without being limited by the above-mentioned embodiments. That is to say, the at least one sensing electrode among the row of sensing electrodes selected by the sensing driver 12 and the at least one corresponding sensing electrode among the another row of sensing electrodes selected by the sensing driver 12 are adjacent to each other; the number of the at least one sensing electrode among the row of sensing electrodes selected by the sensing driver 12 and the number of the at least one corresponding sensing electrode among the another row of sensing electrodes selected by the sensing driver 12 can be the same or different; that is to say, the corresponding relationship between the number of the at least one sensing electrode among the row of sensing electrodes and the number of the at least one corresponding sensing electrode among the another row of sensing electrodes can be one-to-one, one-to-many, many-to-one or many-to-many. It can be adjusted based on practical needs without any specific limitations. In addition, the sensing driver 12 can select the at least one sensing electrode among the row of sensing electrodes as the signal transmitter (TX) of the mutual-capacitive sensing and select the at least one corresponding sensing electrode among the another row of sensing electrodes as the signal receiver (RX) of the mutual-capacitive sensing, or the sensing driver 12 can also select the at least one corresponding sensing electrode among the another row of sensing electrodes as the signal transmitter (TX) of the mutual-capacitive sensing and select the at least one sensing electrode among the row of sensing electrodes as the signal receiver (RX) of the mutual-capacitive sensing.

For example, in the one-to-one embodiments, the sensing driver 12 can select one sensing electrode E12 among the first row of sensing electrodes E11~E15 as the signal transmitter (TX) and select one corresponding sensing electrode E22 among the second row of sensing electrodes E21~E25 as the signal receiver (RX) to perform the mutual-capacitive sensing to obtain the third fingerprint sensing signal N3; or on the contrary, the sensing driver 12 can also select one corresponding sensing electrode E22 among the second row of sensing electrodes E21~E25 as the signal transmitter (TX) and select one sensing electrode E12 among the first row of sensing electrodes E11~E15 as the signal receiver (RX) to perform the mutual-capacitive sensing to obtain the third fingerprint sensing signal N3.

In the one-to-many or many-to-one embodiments, the sensing driver 12 can select one sensing electrode E23 among the second row of sensing electrodes E21~E25 as the signal transmitter (TX) and select two corresponding sensing electrodes E33~E34 among the third row of sensing electrodes E31~E35 as the signal receiver (RX) to perform the mutual-capacitive sensing to obtain the third fingerprint sensing signal N3; or on the contrary, the sensing driver 12 can also select two corresponding sensing electrodes E33~E34 among the third row of sensing electrodes E31~E35 as the signal transmitter (TX) and select one sensing electrode E23 among the second row of sensing electrodes E21~E25 as the signal receiver (RX) to perform the mutual-capacitive sensing to obtain the third fingerprint sensing signal N3. The sensing driver 12 can select three sensing electrode E43~E45 among the fourth row of sensing electrodes E41~E45 as the signal transmitter (TX) and select one corresponding sensing electrode E34 among the third row of sensing electrodes E31~E35 as the signal receiver (RX) to perform the mutual-capacitive sensing to obtain the third fingerprint sensing signal N3; or on the contrary, the sensing driver 12 can also select one corresponding sensing electrode E34 among the third row of sensing electrodes E31~E35 as the signal transmitter (TX) and select three sensing electrode E43~E45 among the fourth row of sensing electrodes E41~E45 as the signal receiver (RX) to perform the mutual-capacitive sensing to obtain the third fingerprint sensing signal N3.

In the many-to-many embodiments, the sensing driver 12 can select two adjacent sensing electrodes E43~E44 among the fourth row of sensing electrodes E41~E45 as the signal transmitter (TX) and select three corresponding sensing electrodes E33~E35 among the third row of sensing electrodes E31~E35 as the signal receiver (RX) to perform the mutual-capacitive sensing to obtain the third fingerprint sensing signal N3; or on the contrary, the sensing driver 12 can also select three corresponding sensing electrodes E33~E35 among the third row of sensing electrodes E31~E35 as the signal transmitter (TX) and select two adjacent sensing electrodes E43~E44 among the fourth row of sensing electrodes E41~E45 as the signal receiver (RX) to perform the mutual-capacitive sensing to obtain the third fingerprint sensing signal N3. The sensing driver 12 can select three adjacent sensing electrodes E12~E14 among the first row of sensing electrodes E11~E15 as the signal transmitter (TX) and select three corresponding sensing electrodes E21~E23 among the second row of sensing electrodes E21~E25 as the signal receiver (RX) to perform the mutual-capacitive sensing to obtain the third fingerprint sensing signal N3; or on the contrary, the sensing driver 12 can also select three corresponding sensing electrodes E21~E23 among the second row of sensing electrodes E21~E25 as the signal transmitter (TX) and select three adjacent sensing electrodes E12~E14 among the first row of sensing electrodes E11~E15 as the signal receiver (RX) to perform the mutual-capacitive sensing to obtain the third fingerprint sensing signal N3. The sensing driver 12 can select two adjacent sensing electrodes E24~E25 among the second row of sensing electrodes E21~E25 as the signal transmitter (TX) and select two corresponding sensing electrodes E34~E35 among the third row of sensing electrodes E31~E35 as the signal receiver (RX) to perform the mutual-capacitive sensing to obtain the third fingerprint sensing signal N3; or on the contrary, the sensing driver 12 can also select two corresponding sensing electrodes E34~E35 among the third row of sensing electrodes E31~E35 as the signal transmitter (TX) and select two adjacent sensing electrodes E24~E25 among the second row of sensing electrodes E21~E25 as the signal receiver (RX) to perform the mutual-capacitive sensing to obtain the third fingerprint sensing signal N3. It should be noticed that the above-mentioned embodiments can be adjusted based on practical needs without specific limitations.

In addition, when the capacitive fingerprint sensing apparatus 1" is operated in the self-capacitive sensing mode, the other sensing lines not performing self-capacitive sensing among the multiple pairs of sensing lines can receive DC voltage, ground voltage or maintain in the floating state, but not limited to this; similarly, when the capacitive fingerprint sensing apparatus 1" is operated in the first mutual-capacitive sensing mode or the second mutual-capacitive sensing mode, the other sensing lines not performing mutual-capacitive sensing among the multiple pairs of sensing lines can also receive DC voltage, ground voltage or maintain in the floating state, but not limited to this.

Then, the processing module 14 obtains the first fingerprint pattern, the second fingerprint pattern and the third fingerprint pattern according to the first fingerprint sensing signal N1, the second fingerprint sensing signal N2 and the third fingerprint sensing signal N3 respectively and then combines the first fingerprint pattern, the second fingerprint pattern and the third fingerprint pattern into a combined fingerprint pattern having higher resolution.

Please refer to FIG. 11A. FIG. 11A is a timing diagram of the scan driving signals DG1~DG4 outputted by the scanning driver 10 and the sense driving signals DS1~DS10 outputted by the sensing driver 12 when the capacitive fingerprint sensing apparatus 1" is operated in the self-capacitive sensing mode. As shown in FIG. 11A, during the period of time T1, the scan driving signal DG1 outputted by the scanning driver 10 have a high level, but the scan driving signals DG2~DG4 have a low level. That is to say, during the period of time T1, the scanning driver 10 only drives one scanning line G1 among the scanning lines G1~G4 to perform a scanning on the first row of sensing electrodes E11~E15 and another three sensing lines G2~G4 are not driven. At this time, the sensing driver 12 outputs the sense driving signals DS1, DS3, DS5, DS7 and DS9 to drive the odd sensing lines S1, S3, S5, S7 and S9 coupled to the scanning line G1 to perform self-capacitive sensing on each sensing electrode among the first row of sensing electrodes E11~E15 respectively.

During the period of time T2, the scan driving signal DG2 outputted by the scanning driver 10 has the high level, but the scan driving signals DG1 and DG3~DG4 have the low level. That is to say, during the period of time T2, the scanning driver 10 only drives one scanning line G2 among the scanning lines G1~G4 to perform the scanning on the second row of sensing electrodes E21~E25 and another three sensing lines G1 and G3~G4 are not driven. At this time, the sensing driver 12 outputs the sense driving signals DS2, DS4, DS6, DS8 and DS10 to drive the even sensing lines S2, S4, S6, S8 and S10 coupled to the scanning line G2 to perform self-capacitive sensing on each sensing electrode among the second row of sensing electrodes E21~E25 respectively.

Similarly, during the period of time T3, the scan driving signal DG3 outputted by the scanning driver 10 have a high level, but the scan driving signals DG1~DG2 and DG4 have a low level. That is to say, during the period of time T3, the scanning driver 10 only drives one scanning line G3 among the scanning lines G1~G4 to perform a scanning on the third row of sensing electrodes E31~E35 and another three sensing lines G1~G2 and G4 are not driven. At this time, the sensing driver 12 outputs the sense driving signals DS1, DS3, DS5, DS7 and DS9 to drive the odd sensing lines S1, S3, S5, S7 and S9 coupled to the scanning line G3 to perform self-capacitive sensing on each sensing electrode among the third row of sensing electrodes E31~E35 respectively.

Similarly, during the period of time T4, the scan driving signal DG4 outputted by the scanning driver 10 has the high level, but the scan driving signals DG1~DG3 have the low level. That is to say, during the period of time T4, the scanning driver 10 only drives one scanning line G4 among the scanning lines G1~G4 to perform the scanning on the fourth row of sensing electrodes E41~E45 and another three sensing lines G1~G3 are not driven. At this time, the sensing driver 12 outputs the sense driving signals DS2, DS4, DS6, DS8 and DS10 to drive the even sensing lines S2, S4, S6, S8 and S10 coupled to the scanning line G4 to perform self-capacitive sensing on each sensing electrode among the second row of sensing electrodes E41~E45 respectively. After the periods of time T1~T4, the capacitive fingerprint sensing apparatus 1" operated in the self-capacitive sensing mode can finish the self-capacitive sensing on all sensing electrodes E11~E45 and obtain the first fingerprint sensing signal N1.

Please refer to FIG. 11B. FIG. 11B illustrates a timing diagram of the scan driving signals DG1~DG2 outputted by the scanning driver 10 and the sense driving signals DS1~DS10 outputted by the sensing driver 12 when the capacitive fingerprint sensing apparatus 1" is operated in the first mutual-capacitive sensing mode and the second mutual-capacitive sensing mode. It should be noticed that the scan driving signals DG1~DG2 are taken for example in this embodiment, and the scan driving signals DG3~DG4 can be also used in another embodiment in similar way. As shown in FIG. 11B, during the periods of time T5~T6, the scan driving signal DG1 outputted by the scanning driver 10 has the high level, but the scan driving signal DG2 has the low level. That is to say, during the periods of time T5~T6, the scanning driver 10 only drives one scanning line G1 among the scanning lines G1~G2 to perform a scanning on the first row of sensing electrodes E11~E15 and another sensing line G2 is not driven. At this time, the capacitive fingerprint sensing apparatus 1" is operated in the first mutual-capacitive sensing mode to perform the mutual-capacitive sensing in the horizontal direction.

During the period of time T5, the sensing driver 12 only outputs the sense driving signal DS3 to drive the corresponding sensing line S3 to select a sensing electrode E12 among the first column of the sensing electrodes to perform a mutual-capacitive sensing with the corresponding adjacent sensing electrodes E11 and E13 among the first column of the sensing electrodes. During the period of time T6, the sensing driver 12 only outputs the sense driving signal DS7 to drive the corresponding sensing line S7 to select a sensing electrode E14 among the first column of the sensing electrodes to perform a mutual-capacitive sensing with the corresponding adjacent sensing electrodes E13 and E15 among the first column of the sensing electrodes.

During the periods of time T7~T10, the scan driving signals DG1~DG2 outputted by the scanning driver 10 have the high level. That is to say, during the periods of time T7~T10, the scanning driver 10 will drive both two scanning lines G1~G2 to perform scanning on the first row of sensing electrodes E11~E15 and the second row of sensing electrodes E21~E25 respectively. At this time, the capacitive fingerprint sensing apparatus 1" is operated in the second mutual-capacitive sensing mode to perform the mutual-capacitive sensing in the vertical direction.

During the period of time T7, the sensing driver 12 outputs the sense driving signals DS3 and DS7 to drive the corresponding sensing lines S3 and S7 to select the sensing electrode E12 among the first column of the sensing electrodes to perform a mutual-capacitive sensing with the corresponding adjacent sensing electrodes E21~E22 among the second column of the sensing electrodes and select another sensing electrode E14 among the first column of the sensing electrodes to perform the mutual-capacitive sensing with the corresponding pair of adjacent sensing electrodes E23~E24 among the second column of the sensing electrodes. During the period of time T8, the sensing driver 12 outputs the sense driving signals DS5 and DS9 to drive the corresponding sensing lines S5 and S9 to select the sensing electrode E13 among the first column of the sensing electrodes to perform a mutual-capacitive sensing with the corresponding adjacent sensing electrodes E22~E23 among the second column of the sensing electrodes and select another sensing electrode E15 among the first column of the sensing electrodes to perform the mutual-capacitive sensing with the corresponding pair of adjacent sensing electrodes E24~E25 among the second column of the sensing electrodes.

During the period of time T9, the sensing driver 12 outputs the sense driving signals DS2 and DS6 to drive the corresponding sensing lines S2 and S6 to select the sensing electrode E21 among the second column of the sensing electrodes to perform a mutual-capacitive sensing with the corresponding adjacent sensing electrodes E11~E12 among the first column of the sensing electrodes and select another sensing electrode E23 among the second column of the sensing electrodes to perform the mutual-capacitive sensing with the corresponding pair of adjacent sensing electrodes E13~E14 among the first column of the sensing electrodes. During the period of time T10, the sensing driver 12 outputs the sense driving signals DS4 and DS8 to drive the corresponding sensing lines S4 and S8 to select the sensing electrode E22 among the second column of the sensing electrodes to perform a mutual-capacitive sensing with the corresponding adjacent sensing electrodes E12~E13 among the first column of the sensing electrodes and select another sensing electrode E24 among the second column of the sensing electrodes to perform the mutual-capacitive sensing with the corresponding pair of adjacent sensing electrodes E13~E14 among the first column of the sensing electrodes.

Then, during the periods of time T11~T12, the scan driving signal DG1 outputted by the scanning driver 10 have the low level, but the scan driving signal DG2 have the high level. That is to say, during the periods of time T11~T12, the scanning driver 10 only drives one scanning line G2 among the scanning lines G1~G2 to perform a scanning on the second row of sensing electrodes E21~E25 and another scanning line G1 is not driven. At this time, the capacitive fingerprint sensing apparatus 1" is operated in the first mutual-capacitive sensing mode to perform the mutual-capacitive sensing in the horizontal direction.

During the period of time T11, the sensing driver 12 only outputs the sense driving signal DS4 to drive the corresponding sensing line S4 to select a sensing electrode E22 among the second column of the sensing electrodes to perform a mutual-capacitive sensing with the corresponding adjacent sensing electrodes E21 and E23 among the second column of the sensing electrodes. During the period of time T12, the sensing driver 12 only outputs the sense driving signal DS8 to drive the corresponding sensing line S8 to select a sensing electrode E24 among the second column of the sensing electrodes to perform a mutual-capacitive sensing with the corresponding adjacent sensing electrodes E23 and E25 among the second column of the sensing electrodes.

After the periods of time T5~T12, since the capacitive fingerprint sensing apparatus 1" is operated in the first mutual-capacitive sensing mode during the periods of time T5~T6 and T11~T12 and operated in the second mutual-capacitive sensing mode during the periods of time T7~T10, the capacitive fingerprint sensing apparatus 1" can finish the mutual-capacitive sensing on the first row of sensing electrodes E11~E15 and the second row of sensing electrodes E21~E25. Then, the capacitive fingerprint sensing apparatus 1" can finish the mutual-capacitive sensing on the second row of sensing electrodes E21~E25 and the third row of sensing electrodes E31~E35 and the mutual-capacitive sensing on the third row of sensing electrodes E31~E35 and the fourth row of sensing electrodes E41~E45 to obtain the second fingerprint sensing signal N2 and the third fingerprint sensing signal N3.

At last, the processing module 14 obtains the first fingerprint pattern, the second fingerprint pattern and the third fingerprint pattern according to the first fingerprint sensing signal N1, the second fingerprint sensing signal N2 and the third fingerprint sensing signal N3 respectively and then combines the first fingerprint pattern, the second fingerprint pattern and the third fingerprint pattern into a combined fingerprint pattern having higher resolution. Compared to the prior arts, the capacitive fingerprint sensing apparatus 1" of this embodiment has advantages of increasing self-capacity sensed by the unit sensing electrode and the scanning driver 10 having simple timing.

A sixth preferred embodiment of the invention is a capacitive fingerprint sensing method. In this embodiment, the capacitive fingerprint sensing method is applied in a self-capacitive sensing mode or a mutual-capacitive sensing mode. As shown in FIG. 12, in STEP 1", the method arranges (M*N) sensing electrodes along a first direction and a second direction respectively to form M rows of sensing electrodes and N columns of sensing electrodes, wherein odd sensing electrodes and even sensing electrodes among each row of sensing electrodes are interlaced, and the method couples a scanning driver to the M rows of sensing electrodes respectively through M scanning lines and a sensing driver coupled to the N columns of sensing electrodes respectively through N pairs of sensing lines, wherein a pair of sensing lines among the N pairs of sensing lines comprises a first sensing line and a second sensing line, the first sensing line is coupled to an odd sensing electrode among a column of sensing electrodes among the N column of sensing electrodes and the second sensing line is coupled to an even sensing electrode among the column of sensing electrodes, or the second sensing line is coupled to the odd sensing electrode among the column of sensing electrodes and the first sensing line is coupled to the even sensing electrode among the column of sensing electrodes; the first sensing line is coupled to an odd scanning line among the M scanning lines and the second sensing line is coupled to an even scanning line among the M scanning lines, or the second sensing line is coupled to the odd scanning line among the M scanning lines and the first sensing line is coupled to the even scanning line among the M scanning lines. M and N are both positive integers.

Then, the method performs STEP 2", in the self-capacitive sensing mode, the scanning driver drives the M scanning lines and the sensing driver performing a self-capacitive sensing through at least one sensing line among the N pairs of sensing lines to obtain a first fingerprint sensing signal; in the first mutual-capacitive sensing mode, the scanning driver drives a scanning line among the M scanning lines and the sensing driver selects sensing electrodes coupled to an even sensing line and an odd sensing line among the sensing lines respectively coupled by the driven scanning line to perform a mutual-capacitive sensing to obtain a second fingerprint sensing signal; in the second mutual-capacitive sensing mode, the scanning driver drives a pair of adjacent scanning lines among the M scanning lines and the sensing driver selects at least one sensing electrode among a row of sensing electrodes coupled by the pair of adjacent scanning lines and corresponding at least one sensing electrode among the other row of sensing electrodes coupled by the pair of adjacent scanning lines to perform another mutual-capacitive sensing to obtain a third fingerprint sensing signal.

It should be noticed that, in the second mutual-capacitive sensing mode, when the capacitive fingerprint sensing apparatus is operated in the second mutual-capacitive sensing mode, the sensing driver can select at least one sensing electrode among a row of sensing electrodes coupled by the driven pair of adjacent scanning lines and select at least one corresponding sensing electrode among another row of sensing electrodes also coupled by the driven pair of adjacent scanning lines to perform mutual-capacitive sensing to obtain the third fingerprint sensing signal without being limited by the above-mentioned embodiments. That is to say, the at least one sensing electrode among the row of sensing electrodes selected by the sensing driver and the at least one corresponding sensing electrode among the another row of sensing electrodes selected by the sensing driver are adjacent to each other; the number of the at least one sensing electrode among the row of sensing electrodes selected by the sensing driver and the number of the at least one corresponding sensing electrode among the another row of sensing electrodes selected by the sensing driver can be the same or different; that is to say, the corresponding relationship between the number of the at least one sensing electrode among the row of sensing electrodes and the number of the at least one corresponding sensing electrode among the another row of sensing electrodes can be one-to-one, one-to-many, many-to-one or many-to-many. It can be adjusted based on practical needs without any specific limitations. In addition, the sensing driver can select the at least one sensing electrode among the row of sensing electrodes as the signal transmitter (TX) of the mutual-capacitive sensing and select the at least one corresponding sensing electrode among the another row of sensing electrodes as the signal receiver (RX) of the mutual-capacitive sensing, or the sensing driver can also select the at least one corresponding sensing electrode among the another row of sensing electrodes as the signal transmitter (TX) of the mutual-capacitive sensing and select the at least one sensing electrode among the row of sensing electrodes as the signal receiver (RX) of the mutual-capacitive sensing.

For example, in the one-to-one embodiments, the sensing driver can select one sensing electrode E12 among the first row of sensing electrodes E11~E15 as the signal transmitter (TX) and select one corresponding sensing electrode E22 among the second row of sensing electrodes E21~E25 as the signal receiver (RX) to perform the mutual-capacitive sensing to obtain the third fingerprint sensing signal N3; or on the contrary, the sensing driver can also select one corresponding sensing electrode E22 among the second row of sensing electrodes E21~E25 as the signal transmitter (TX) and select one sensing electrode E12 among the first row of sensing electrodes E11~E15 as the signal receiver (RX) to perform the mutual-capacitive sensing to obtain the third fingerprint sensing signal.

In the one-to-many or many-to-one embodiments, the sensing driver can select one sensing electrode E23 among the second row of sensing electrodes E21~E25 as the signal transmitter (TX) and select two corresponding sensing electrodes E33~E34 among the third row of sensing electrodes E31~E35 as the signal receiver (RX) to perform the mutual-capacitive sensing to obtain the third fingerprint sensing signal; or on the contrary, the sensing driver can also select two corresponding sensing electrodes E33~E34 among the third row of sensing electrodes E31~E35 as the signal transmitter (TX) and select one sensing electrode E23 among the second row of sensing electrodes E21~E25 as the signal receiver (RX) to perform the mutual-capacitive sensing to obtain the third fingerprint sensing signal. The sensing driver can select three sensing electrode E43~E45 among the fourth row of sensing electrodes E41~E45 as the signal transmitter (TX) and select one corresponding sensing electrode E34 among the third row of sensing electrodes E31~E35 as the signal receiver (RX) to perform the mutual-capacitive sensing to obtain the third fingerprint sensing signal; or on the contrary, the sensing driver can also select one corresponding sensing electrode E34 among the third row of sensing electrodes E31~E35 as the signal transmitter (TX) and select three sensing electrode E43~E45 among the fourth row of sensing electrodes E41~E45 as the signal receiver (RX) to perform the mutual-capacitive sensing to obtain the third fingerprint sensing signal.

In the many-to-many embodiments, the sensing driver can select two adjacent sensing electrodes E43~E44 among the fourth row of sensing electrodes E41~E45 as the signal transmitter (TX) and select three corresponding sensing electrodes E33~E35 among the third row of sensing electrodes E31~E35 as the signal receiver (RX) to perform the mutual-capacitive sensing to obtain the third fingerprint sensing signal; or on the contrary, the sensing driver can also select three corresponding sensing electrodes E33~E35 among the third row of sensing electrodes E31~E35 as the signal transmitter (TX) and select two adjacent sensing electrodes E43~E44 among the fourth row of sensing electrodes E41~E45 as the signal receiver (RX) to perform the mutual-capacitive sensing to obtain the third fingerprint sensing signal. The sensing driver can select three adjacent sensing electrodes E12~E14 among the first row of sensing electrodes E11~E15 as the signal transmitter (TX) and select three corresponding sensing electrodes E21~E23 among the second row of sensing electrodes E21~E25 as the signal receiver (RX) to perform the mutual-capacitive sensing to obtain the third fingerprint sensing signal; or on the contrary, the sensing driver can also select three corresponding sensing electrodes E21~E23 among the second row of sensing electrodes E21~E25 as the signal transmitter (TX) and select three adjacent sensing electrodes E12~E14 among the first row of sensing electrodes E11~E15 as the signal receiver (RX) to perform the mutual-capacitive sensing to obtain the third fingerprint sensing signal. The sensing driver can select two adjacent sensing electrodes E24~E25 among the second row of sensing electrodes E21~E25 as the signal transmitter (TX) and select two corresponding sensing electrodes E34~E35 among the third row of sensing electrodes E31~E35 as the signal receiver (RX) to perform the mutual-capacitive sensing to obtain the third fingerprint sensing signal; or on the contrary, the sensing driver can also select two corresponding sensing electrodes E34~E35 among the third row of sensing electrodes E31~E35 as the signal transmitter (TX) and select two adjacent sensing electrodes E24~E25 among the second row of sensing electrodes E21~E25 as the signal receiver (RX) to perform the mutual-capacitive sensing to obtain the third fingerprint sensing signal. It should be noticed that the above-mentioned embodiments can be adjusted based on practical needs without specific limitations.

At last, in STEP 3", the method generates a first fingerprint pattern, a second fingerprint pattern and a third fingerprint pattern according to the first fingerprint sensing signal, the second fingerprint sensing signal and the third fingerprint sensing signal respectively and combines the first fingerprint pattern, the second fingerprint pattern and the third fingerprint pattern into a combined fingerprint pattern.

Figure 13A:
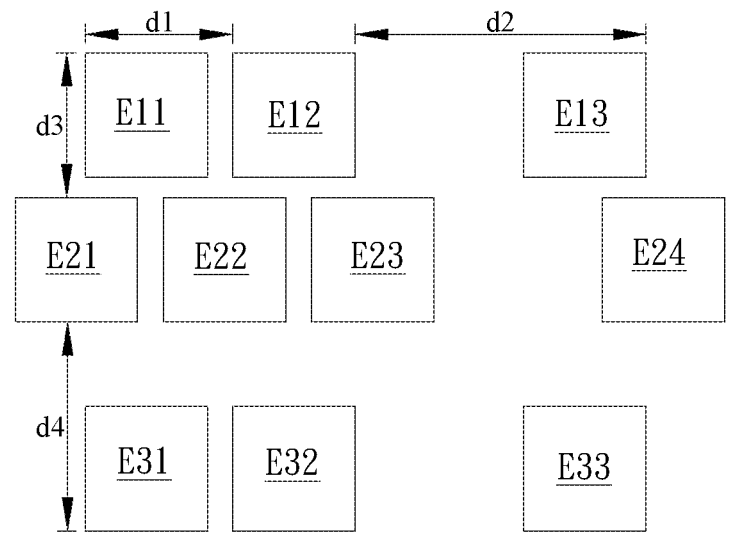
Figure 13B:
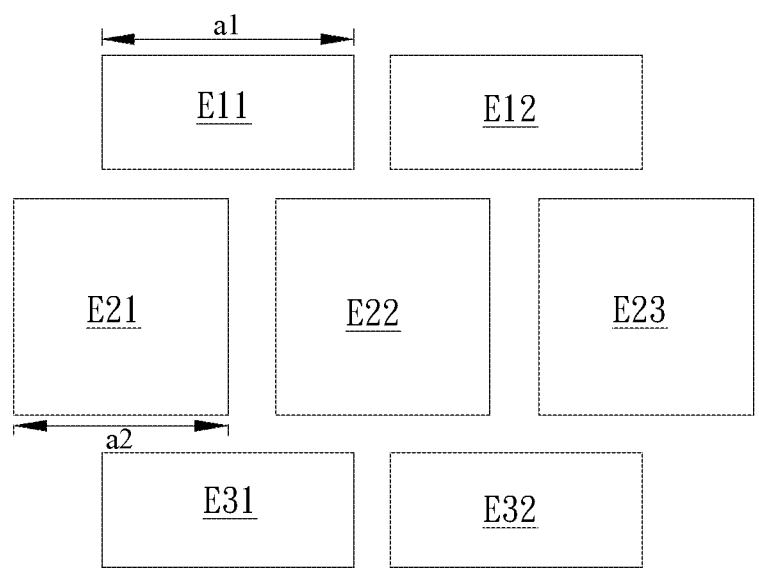
Figure 13C:
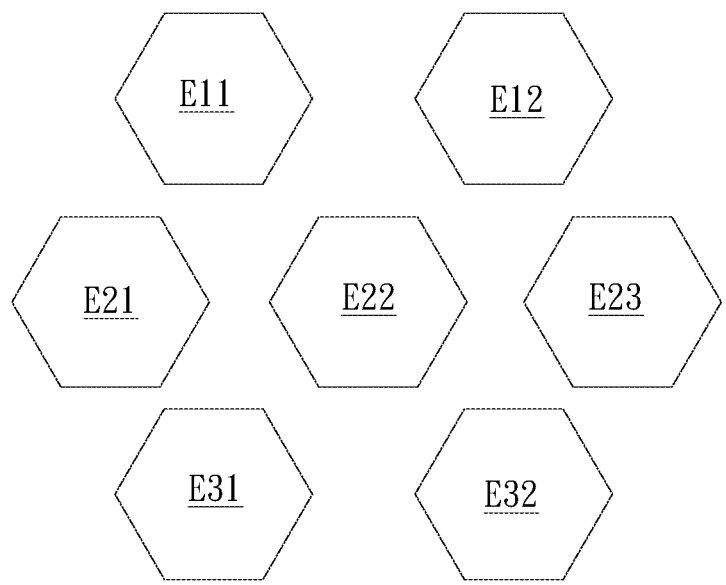
Figure 13D:
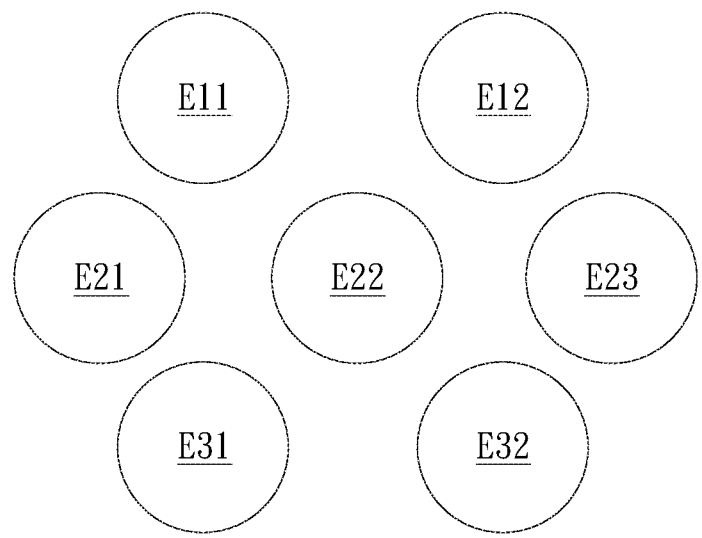

Then, please refer to FIG. 13A~FIG. 13D. FIG. 13A~FIG. 13D illustrate different sensing electrode arrangements respectively. As shown in FIG. 13A, the distances among the sensing electrodes E11~E33 can be the same or different. For example, the first distance d1 is different from the second distance d2 and the third distance d3 is different from the fourth distance d4. The first distance d1 and the third distance d3 are the same, but not limited to this. As shown in FIG. 13B, the lengths and sizes of the sensing electrodes E11~E32 can be the same or different. For example, the first length a1 of the sensing electrode E11 and the second length a2 of the sensing electrode E21 are different, that is to say, the size of the sensing electrode E11 and the size of the sensing electrode E21 are different, but not limited to this. As shown in FIG. 13C and FIG. 13D, the shapes of the sensing electrodes E11~E32 can be hexagonal, circle, polygon or any other geometry without specific limitations.

Compared to the prior art, the capacitive fingerprint sensing apparatus and capacitive fingerprint sensing method of the invention perform fingerprint sensing through self-capacitive sensing technology and mutual-capacitive sensing technology respectively and combine the self-capacitive fingerprint pattern and the mutual-capacitive fingerprint pattern into a combined fingerprint pattern. Therefore, the capacitive fingerprint sensing apparatus and capacitive fingerprint sensing method of the invention can effectively increase the capacity sensed by the unit sensing electrode without decreasing its high resolution. As a result, not only the noise interference can be reduced to increase the accuracy of fingerprint recognition, but also the number of signal traces can be also reduced to simplify the circuit structure and save the chip area.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A capacitive fingerprint sensing apparatus operated in a self-capacitive sensing mode or a mutual-capacitive sensing mode, the capacitive fingerprint sensing apparatus comprising:
   (M*N) sensing electrodes arranged to form a (M*N) matrix having M rows of sensing electrodes and N columns of sensing electrodes, wherein M and N are both positive integers;
   a scanning driver coupled to the M rows of sensing electrodes respectively through M scanning lines;
   a sensing driver coupled to the N columns of sensing electrodes respectively through N sensing lines; and
   a processing module coupled to the scanning driver and the sensing driver;
   wherein when the capacitive fingerprint sensing apparatus is operated in the self-capacitive sensing mode, the scanning driver drives a pair of adjacent scanning lines among the M scanning lines and the sensing driver performs a self-capacitive sensing through at least one sensing line among the N sensing lines to obtain a first fingerprint sensing signal; when the capacitive fingerprint sensing apparatus is operated in the mutual-capacitive sensing mode, the scanning driver drives the pair of adjacent scanning lines and the sensing driver performs a mutual-capacitive sensing through at least two adjacent sensing lines among the N sensing lines to obtain a second fingerprint sensing signal; the processing module generates a first fingerprint pattern and a second fingerprint pattern according to the first fingerprint sensing signal and the second fingerprint sensing signal and combines the first fingerprint pattern and the second fingerprint pattern into a combined fingerprint pattern.

2. The capacitive fingerprint sensing apparatus of claim 1, wherein when the capacitive fingerprint sensing apparatus is operated in the mutual-capacitive sensing mode, the sensing driver selects at least two adjacent sensing electrodes coupled to the at least two adjacent sensing lines as a mutual-capacitive sensing electrode set and selects a part of the mutual-capacitive sensing electrode set as a signal transmitter (TX) and another part of the mutual-capacitive sensing electrode set as a signal receiver (RX) to perform the mutual-capacitive sensing between the signal transmitter (TX) and the signal receiver (RX).

3. The capacitive fingerprint sensing apparatus of claim 1, wherein when the capacitive fingerprint sensing apparatus is operated in the mutual-capacitive sensing mode, other sensing lines other than the at least two adjacent sensing lines among the N sensing lines receive DC voltage, ground voltage or maintain in floating state.

4. The capacitive fingerprint sensing apparatus of claim 1, wherein when the capacitive fingerprint sensing apparatus is operated in the self-capacitive sensing mode, other sensing lines other than the at least one adjacent sensing line among the N sensing lines receive DC voltage, ground voltage or maintain in floating state.

5. The capacitive fingerprint sensing apparatus of claim 1, wherein a ratio of a first direction distance between two adjacent sensing electrodes in the same row of sensing electrodes and a second direction distance between two adjacent sensing electrodes in the same column of sensing electrodes is d1:d2, a ratio of a first direction resolution and a second direction resolution of the first fingerprint pattern and the second fingerprint pattern is d2:d1, and a ratio of a first direction resolution and a second direction resolution of the combined fingerprint pattern is (2*d2):d1.

6. The capacitive fingerprint sensing apparatus of claim 5, wherein d1:d2 is any ratio.

7. The capacitive fingerprint sensing apparatus of claim 5, wherein when d1 is equal to (2*d2), the first direction resolution and the second direction resolution of the combined fingerprint pattern are the same; when d1 is larger than (2*d2), the first direction resolution of the combined fingerprint pattern is smaller than the second direction resolution of the combined fingerprint pattern; when d1 is smaller than (2*d2), the first direction resolution of the combined fingerprint pattern is larger than the second direction resolution of the combined fingerprint pattern.

8. The capacitive fingerprint sensing apparatus of claim 1, wherein the (M*N) sensing electrodes have arbitrary geometry.

9. The capacitive fingerprint sensing apparatus of claim 1, wherein the (M*N) sensing electrodes have the same or different size, shape and/or distance.

10. The capacitive fingerprint sensing apparatus of claim 1, wherein when the capacitive fingerprint sensing apparatus is operated in the self-capacitive sensing mode, the sensing driver combines at least two sensing electrodes of the (M*N) sensing electrodes into a self-capacitive sensing electrode set to perform self-capacitive sensing to increase sensed self-capacity.

11. The capacitive fingerprint sensing apparatus of claim 1, wherein sensing points of the first fingerprint pattern and the second fingerprint pattern are interlaced, so that a resolution of the combined fingerprint pattern is higher than a resolution of the first fingerprint pattern or the second fingerprint pattern.

12. The capacitive fingerprint sensing apparatus of claim 1, further comprising:
a switching module coupled between the sensing driver and the processing module, wherein the switching module selectively switches between the self-capacitive sensing mode and the mutual-capacitive sensing mode and transmits the first fingerprint sensing signal and the second fingerprint sensing signal to the processing module.

13. The capacitive fingerprint sensing apparatus of claim 12, further comprising:
an amplifying module coupled between the switching module and the processing module, wherein the amplifying module amplifies the first fingerprint sensing signal and the second fingerprint sensing signal and then transmits the amplified first fingerprint sensing signal and second fingerprint sensing signal to the processing module.

14. A capacitive fingerprint sensing apparatus operated in a self-capacitive sensing mode or a mutual-capacitive sensing mode, the capacitive fingerprint sensing apparatus comprising:

(M*N) sensing electrodes arranged to form a (M*N) matrix having M rows of sensing electrodes and N columns of sensing electrodes, wherein M and N are both positive integers;
a scanning driver coupled to the M rows of sensing electrodes respectively through M scanning lines;
a sensing driver coupled to the N columns of sensing electrodes respectively through N pairs of sensing lines, wherein a pair of sensing lines among the N pairs of sensing lines is coupled to a column of sensing electrodes among the N columns of sensing electrodes, the pair of sensing lines comprises a first sensing line and a second sensing line, the first sensing line is coupled to an odd sensing electrode among the column of sensing electrodes and the second sensing line is coupled to an even sensing electrode among the column of sensing electrodes, or the second sensing line is coupled to the odd sensing electrode among the column of sensing electrodes and the first sensing line is coupled to the even sensing electrode among the column of sensing electrodes; the first sensing line is coupled to an odd scanning line among the M scanning lines and the second sensing line is coupled to an even scanning line among the M scanning lines, or the second sensing line is coupled to the odd scanning line among the M scanning lines and the first sensing line is coupled to the even scanning line among the M scanning lines; and
a processing module coupled to the scanning driver and the sensing driver;
wherein when the capacitive fingerprint sensing apparatus is operated in the self-capacitive sensing mode, the scanning driver drives the odd scanning line and the even scanning line among the M scanning lines and the sensing driver performs a self-capacitive sensing through at least one sensing line among the N pairs of sensing lines to obtain a first fingerprint sensing signal; when the capacitive fingerprint sensing apparatus is operated in the mutual-capacitive sensing mode, the scanning driver drives a pair of adjacent scanning lines among the M scanning lines and the sensing driver performs a mutual-capacitive sensing through the first sensing line and the second sensing line to obtain a second fingerprint sensing signal; the processing module generates a first fingerprint pattern and a second fingerprint pattern according to the first fingerprint sensing signal and the second fingerprint sensing signal and combines the first fingerprint pattern and the second fingerprint pattern into a combined fingerprint pattern.

15. The capacitive fingerprint sensing apparatus of claim 14, wherein when the capacitive fingerprint sensing apparatus is operated in the mutual-capacitive sensing mode, the sensing driver selects the odd sensing electrode and the even sensing electrode coupled to the first sensing line and the second sensing line respectively as a mutual-capacitive sensing electrode set and selects a part of the mutual-capacitive sensing electrode set as a signal transmitter (TX) and another part of the mutual-capacitive sensing electrode set as a signal receiver (RX) to perform the mutual-capacitive sensing between the signal transmitter (TX) and the signal receiver (RX).

16. The capacitive fingerprint sensing apparatus of claim 14, wherein when the capacitive fingerprint sensing apparatus is operated in the mutual-capacitive sensing mode, other sensing lines other than the first sensing line and the second sensing line among the N pairs of sensing lines receive DC voltage, ground voltage or maintain in floating state.

17. The capacitive fingerprint sensing apparatus of claim 14, wherein when the capacitive fingerprint sensing apparatus is operated in the self-capacitive sensing mode, other sensing lines other than the odd scanning line and the even scanning line among the N pairs of sensing lines receive DC voltage, ground voltage or maintain in floating state.

18. The capacitive fingerprint sensing apparatus of claim 14, wherein a ratio of a first direction distance between two adjacent sensing electrodes in the same row of sensing electrodes and a second direction distance between two adjacent sensing electrodes in the same column of sensing electrodes is d1:d2, a ratio of a first direction resolution and a second direction resolution of the first fingerprint pattern and the second fingerprint pattern is d2:d1, and a ratio of a first direction resolution and a second direction resolution of the combined fingerprint pattern is d2:(2*d1).

19. The capacitive fingerprint sensing apparatus of claim 18, wherein d1:d2 is any ratio.

20. The capacitive fingerprint sensing apparatus of claim 18, wherein when d2 is equal to (2*d1), the first direction resolution and the second direction resolution of the combined fingerprint pattern are the same; when d2 is larger than (2*d1), the first direction resolution of the combined fingerprint pattern is larger than the second direction resolution of the combined fingerprint pattern; when d2 is smaller than (2*d1), the first direction resolution of the combined fingerprint pattern is smaller than the second direction resolution of the combined fingerprint pattern.

21. The capacitive fingerprint sensing apparatus of claim 14, wherein the (M*N) sensing electrodes have arbitrary geometry.

22. The capacitive fingerprint sensing apparatus of claim 14, wherein the (M*N) sensing electrodes have the same or different size, shape and/or distance.

23. The capacitive fingerprint sensing apparatus of claim 14, wherein when the capacitive fingerprint sensing apparatus is operated in the self-capacitive sensing mode, the sensing driver combines at least two sensing electrodes of the (M*N) sensing electrodes into a self-capacitive sensing electrode set to perform self-capacitive sensing to increase sensed self-capacity.

24. The capacitive fingerprint sensing apparatus of claim 14, wherein sensing points of the first fingerprint pattern and the second fingerprint pattern are interlaced, so that a resolution of the combined fingerprint pattern is higher than a resolution of the first fingerprint pattern or the second fingerprint pattern.

25. The capacitive fingerprint sensing apparatus of claim 14, further comprising:
a switching module coupled between the sensing driver and the processing module, wherein the switching module selectively switches between the self-capacitive sensing mode and the mutual-capacitive sensing mode and transmits the first fingerprint sensing signal and the second fingerprint sensing signal to the processing module.

26. The capacitive fingerprint sensing apparatus of claim 24, further comprising:
an amplifying module coupled between the switching module and the processing module, wherein the amplifying module amplifies the first fingerprint sensing signal and the second fingerprint sensing signal and then transmits the amplified first fingerprint sensing signal and second fingerprint sensing signal to the processing module.

27. A capacitive fingerprint sensing apparatus operated in a self-capacitive sensing mode, a first mutual-capacitive sensing mode or a second mutual-capacitive sensing mode, the capacitive fingerprint sensing apparatus comprising:
(M*N) sensing electrodes arranged along a first direction and a second direction respectively to form M rows of sensing electrodes and N columns of sensing electrodes, wherein odd sensing electrodes and even sensing electrodes among each row of sensing electrodes are interlaced, M and N are both positive integers;
a scanning driver coupled to the M rows of sensing electrodes respectively through M scanning lines;
a sensing driver coupled to the N columns of sensing electrodes respectively through N pairs of sensing lines, wherein a pair of sensing lines among the N pairs of sensing lines comprises a first sensing line and a second sensing line, the first sensing line is coupled to an odd sensing electrode among a column of sensing electrodes among the N column of sensing electrodes and the second sensing line is coupled to an even sensing electrode among the column of sensing electrodes, or the second sensing line is coupled to the odd sensing electrode among the column of sensing electrodes and the first sensing line is coupled to the even sensing electrode among the column of sensing electrodes; the first sensing line is coupled to an odd scanning line among the M scanning lines and the second sensing line is coupled to an even scanning line among the M scanning lines, or the second sensing line is coupled to the odd scanning line among the M scanning lines and the first sensing line is coupled to the even scanning line among the M scanning lines; and
a processing module coupled to the scanning driver and the sensing driver;
wherein when the capacitive fingerprint sensing apparatus is operated in the self-capacitive sensing mode, the scanning driver drives the M scanning lines and the sensing driver performs a self-capacitive sensing through at least one sensing line among the N pairs of sensing lines to obtain a first fingerprint sensing signal; when the capacitive fingerprint sensing apparatus is operated in the first mutual-capacitive sensing mode, the scanning driver drives a scanning line among the M scanning lines and the sensing driver selects sensing electrodes coupled to an even sensing line and an odd sensing line among the sensing lines respectively coupled by the driven scanning line to perform a mutual-capacitive sensing to obtain a second fingerprint sensing signal; when the capacitive fingerprint sensing apparatus is operated in the second mutual-capacitive sensing mode, the scanning driver drives a pair of adjacent scanning lines among the M scanning lines and the sensing driver selects at least one sensing electrode among a row of sensing electrodes coupled by the pair of adjacent scanning lines and corresponding at least one sensing electrode among the other row of sensing electrodes coupled by the pair of adjacent scanning lines to perform another mutual-capacitive sensing to obtain a third fingerprint sensing signal; the processing module generates a first fingerprint pattern, a second fingerprint pattern and a third fingerprint pattern according to the first fingerprint sensing signal, the second fingerprint sensing signal and the third fingerprint sensing signal respectively and combines the first fingerprint pattern, the second fingerprint pattern and the third fingerprint pattern into a combined fingerprint pattern.

28. The capacitive fingerprint sensing apparatus of claim 27, wherein when the capacitive fingerprint sensing apparatus is operated in the self-capacitive sensing mode, other sensing lines without performing self-capacitive sensing among the N pairs of sensing lines receive DC voltage, ground voltage or maintain in floating state; when the capacitive fingerprint sensing apparatus is operated in the first mutual-capacitive sensing mode or the second mutual-capacitive sensing mode, other sensing lines without performing mutual-capacitive sensing among the N pairs of sensing lines receive DC voltage, ground voltage or maintain in floating state.

29. The capacitive fingerprint sensing apparatus of claim 27, wherein the (M*N) sensing electrodes have the same or different size, shape and/or distance.

30. The capacitive fingerprint sensing apparatus of claim 27, wherein when the capacitive fingerprint sensing apparatus is operated in the second mutual-capacitive sensing mode, the at least one sensing electrode among the row of sensing electrodes selected by the sensing driver can be one sensing electrode or a plurality of adjacent sensing electrodes and the corresponding at least one sensing electrode among the another row of sensing electrodes selected by the sensing driver can be also one sensing electrode or a plurality of adjacent sensing electrodes.

31. The capacitive fingerprint sensing apparatus of claim 27, wherein when the capacitive fingerprint sensing apparatus is operated in the second mutual-capacitive sensing mode, a number of the at least one sensing electrode among the row of sensing electrodes selected by the sensing driver and a number of the corresponding at least one sensing electrode among the another row of sensing electrodes selected by the sensing driver is the same or different.

32. A capacitive fingerprint sensing method applied in a self-capacitive sensing mode or a mutual-capacitive sensing mode, the capacitive fingerprint sensing method comprising steps of:
   arranging (M*N) sensing electrodes to form a (M*N) matrix having M rows of sensing electrodes and N columns of sensing electrodes, wherein M and N are both positive integers;
   coupling a scanning driver to the M rows of sensing electrodes respectively through M scanning lines and coupling a sensing driver to the N columns of sensing electrodes respectively through N sensing lines;
   in the self-capacitive sensing mode, the scanning driver driving a pair of adjacent scanning lines among the M scanning lines and the sensing driver performing a self-capacitive sensing through at least one sensing line among the N sensing lines to obtain a first fingerprint sensing signal;
   in the mutual-capacitive sensing mode, the scanning driver driving the pair of adjacent scanning lines and the sensing driver performing a mutual-capacitive sensing through at least two adjacent sensing lines among the N sensing lines to obtain a second fingerprint sensing signal; and
   generating a first fingerprint pattern and a second fingerprint pattern according to the first fingerprint sensing signal and the second fingerprint sensing signal and combining the first fingerprint pattern and the second fingerprint pattern into a combined fingerprint pattern.

33. A capacitive fingerprint sensing method applied in a self-capacitive sensing mode or a mutual-capacitive sensing mode, the capacitive fingerprint sensing method comprising steps of:
   arranging (M*N) sensing electrodes to form a (M*N) matrix having M rows of sensing electrodes and N columns of sensing electrodes, wherein M and N are both positive integers;
   coupling a scanning driver to the M rows of sensing electrodes respectively through M scanning lines and coupling a sensing driver to the N columns of sensing electrodes respectively through N pairs of sensing lines, wherein a pair of sensing lines among the N pairs of sensing lines is coupled to a column of sensing electrodes among the N columns of sensing electrodes, the pair of sensing lines comprises a first sensing line and a second sensing line, the first sensing line is coupled to an odd sensing electrode among the column of sensing electrodes and the second sensing line is coupled to an even sensing electrode among the column of sensing electrodes, or the second sensing line is coupled to the odd sensing electrode among the column of sensing electrodes and the first sensing line is coupled to the even sensing electrode among the column of sensing electrodes; the first sensing line is coupled to an odd scanning line among the M scanning lines and the second sensing line is coupled to an even scanning line among the M scanning lines, or the second sensing line is coupled to the odd scanning line among the M scanning lines and the first sensing line is coupled to the even scanning line among the M scanning lines;
   in the self-capacitive sensing mode, the scanning driver driving the odd scanning line and the even scanning line among the M scanning lines and the sensing driver performing a self-capacitive sensing through at least one sensing line among the N pairs of sensing lines to obtain a first fingerprint sensing signal;
   in the mutual-capacitive sensing mode, the scanning driver driving a pair of adjacent scanning lines among the M scanning lines and the sensing driver performing a mutual-capacitive sensing through the first sensing line and the second sensing line to obtain a second fingerprint sensing signal; and
   generating a first fingerprint pattern and a second fingerprint pattern according to the first fingerprint sensing signal and the second fingerprint sensing signal and combining the first fingerprint pattern and the second fingerprint pattern into a combined fingerprint pattern.

34. A capacitive fingerprint sensing method applied in a self-capacitive sensing mode, a first mutual-capacitive sensing mode or a second mutual-capacitive sensing mode, the capacitive fingerprint sensing method comprising steps of:
   arranging (M*N) sensing electrodes along a first direction and a second direction respectively to form M rows of sensing electrodes and N columns of sensing electrodes, wherein odd sensing electrodes and even sensing electrodes among each row of sensing electrodes are interlaced, M and N are both positive integers;
   coupling a scanning driver to the M rows of sensing electrodes respectively through M scanning lines and a sensing driver coupled to the N columns of sensing electrodes respectively through N pairs of sensing lines, wherein a pair of sensing lines among the N pairs of sensing lines comprises a first sensing line and a second sensing line, the first sensing line is coupled to an odd sensing electrode among a column of sensing electrodes among the N column of sensing electrodes and the second sensing line is coupled to an even sensing electrode among the column of sensing electrodes, or the second sensing line is coupled to the odd sensing electrode among the column of sensing electrodes and the first sensing line is coupled to the even sensing electrode among the column of sensing electrodes; the first sensing line is coupled to an odd scanning line among the M scanning lines and the second sensing line is coupled to an even scanning line among the M scanning lines, or the second sensing line is coupled to the odd scanning line among the M scanning lines and the first sensing line is coupled to the even scanning line among the M scanning lines;

in the self-capacitive sensing mode, the scanning driver driving the M scanning lines and the sensing driver performing a self-capacitive sensing through at least one sensing line among the N pairs of sensing lines to obtain a first fingerprint sensing signal;

in the first mutual-capacitive sensing mode, the scanning driver driving a scanning line among the M scanning lines and the sensing driver selecting sensing electrodes coupled to an even sensing line and an odd sensing line among the sensing lines respectively coupled by the driven scanning line to perform a mutual-capacitive sensing to obtain a second fingerprint sensing signal;

in the second mutual-capacitive sensing mode, the scanning driver driving a pair of adjacent scanning lines among the M scanning lines and the sensing driver selecting at least one sensing electrode among a row of sensing electrodes coupled by the pair of adjacent scanning lines and corresponding at least one sensing electrode among the other row of sensing electrodes coupled by the pair of adjacent scanning lines to perform another mutual-capacitive sensing to obtain a third fingerprint sensing signal; and generating a first fingerprint pattern, a second fingerprint pattern and a third fingerprint pattern according to the first fingerprint sensing signal, the second fingerprint sensing signal and the third fingerprint sensing signal respectively and combining the first fingerprint pattern, the second fingerprint pattern and the third fingerprint pattern into a combined fingerprint pattern.

* * * * *